US012665671B2

(12) United States Patent
Inuzuka

(10) Patent No.: US 12,665,671 B2
(45) Date of Patent: Jun. 23, 2026

(54) COMMUNICATION ROUTE ALLOCATION DEVICE, COMMUNICATION ROUTE ALLOCATION METHOD, AND PROGRAM

(71) Applicant: NTT, Inc., Tokyo (JP)

(72) Inventor: Fumikazu Inuzuka, Musashino (JP)

(73) Assignee: NTT, Inc., Tokyo (JP)

( * ) Notice: Subject to any disclaimer, the term of this patent is extended or adjusted under 35 U.S.C. 154(b) by 280 days.

(21) Appl. No.: 18/561,510

(22) PCT Filed: May 21, 2021

(86) PCT No.: PCT/JP2021/019366
§ 371 (c)(1),
(2) Date: Nov. 16, 2023

(87) PCT Pub. No.: WO2022/244236
PCT Pub. Date: Nov. 24, 2022

(65) Prior Publication Data
US 2024/0235683 A1 Jul. 11, 2024

(51) Int. Cl.
*H04B 10/27* (2013.01)
*H04Q 11/00* (2006.01)

(52) U.S. Cl.
CPC ......... *H04B 10/27* (2013.01); *H04Q 11/0005* (2013.01); *H04Q 11/0062* (2013.01); *H04Q 2011/0075* (2013.01)

(58) Field of Classification Search
CPC .............. H04B 10/27; H04Q 11/0005; H04Q 11/0062; H04Q 2011/0075
USPC ......................................................... 398/204
See application file for complete search history.

(56) References Cited

U.S. PATENT DOCUMENTS

| | | | | |
|---|---|---|---|---|
| 9,197,350 | B2 * | 11/2015 | Zhang ................. | H04J 14/0257 |
| 2020/0266894 | A1 * | 8/2020 | Shen .................... | H04L 41/0896 |
| 2021/0231902 | A1 * | 7/2021 | Winzer ................ | G02B 6/4472 |
| 2023/0122793 | A1 * | 4/2023 | Zhang .................. | H01S 3/1608 |
| | | | | 359/313 |

OTHER PUBLICATIONS

Shohei Fujii et al., "On-Demand Spectrum and Core Allocation for Multi-Core Fibers in Elastic Optical Network", Optical Fiber Communication Conference and Exposition and the National Fiber Optic Engineers Conference (OFC/NFOEC), 10.1364/OFC.2013.OTh4B. 4, 2013.

* cited by examiner

*Primary Examiner* — Dalzid E Singh

(57) ABSTRACT

An aspect of the present invention is a communication route allocation device including a route possibility extraction unit configured to extract connectable possible routes on the basis of utilization condition information of a network from among optical path routes connecting start points to end points of optical paths accommodating communication demand in the network, a core selection unit configured to select a core, a link, and the optical path route to accommodate the optical paths by leveling wavelength utilization conditions over the entire network on the basis of utilization condition information of multicore fibers of all links in the network or the possible routes, and a wavelength selection unit configured to select a wavelength to be used for the core, the link, and the optical path route selected by the route possibility extraction unit and the core selection unit.

8 Claims, 27 Drawing Sheets

FIG. 5

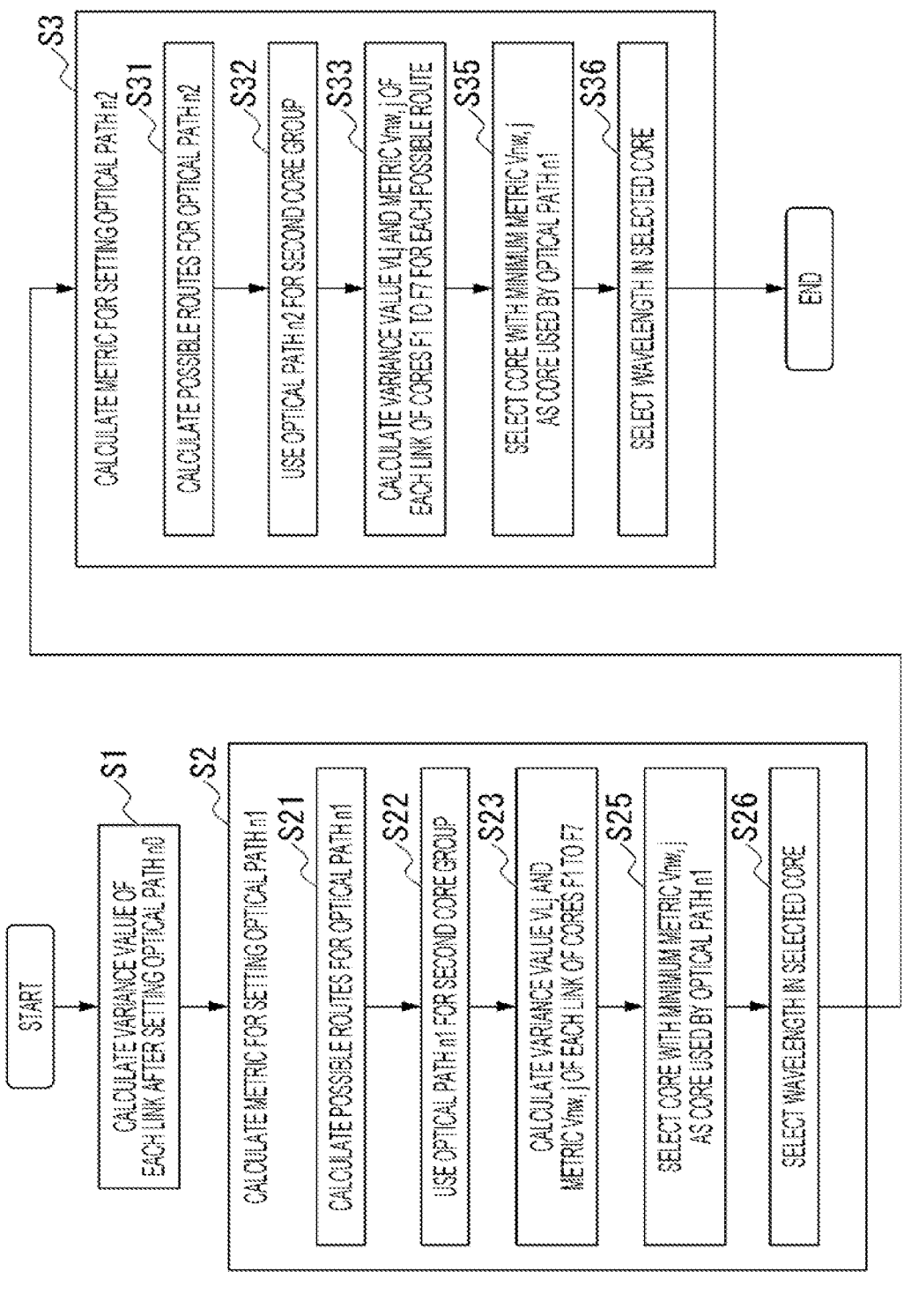

START

S1 — CALCULATE VARIANCE VALUE OF EACH LINK AFTER SETTING OPTICAL PATH n0

S2 — CALCULATE METRIC FOR SETTING OPTICAL PATH n1

S21 — CALCULATE POSSIBLE ROUTES FOR OPTICAL PATH n1

S22 — USE OPTICAL PATH n1 FOR SECOND CORE GROUP

S23 — CALCULATE VARIANCE VALUE VLj AND METRIC Vmw,j OF EACH LINK OF CORES F1 TO F7

S25 — SELECT CORE WITH MINIMUM METRIC Vmw,j AS CORE USED BY OPTICAL PATH n1

S26 — SELECT WAVELENGTH IN SELECTED CORE

S3 — CALCULATE METRIC FOR SETTING OPTICAL PATH n2

S31 — CALCULATE POSSIBLE ROUTES FOR OPTICAL PATH n2

S32 — USE OPTICAL PATH n2 FOR SECOND CORE GROUP

S33 — CALCULATE VARIANCE VALUE VLj AND METRIC Vmw,j OF EACH LINK OF CORES F1 TO F7 FOR EACH POSSIBLE ROUTE

S35 — SELECT CORE WITH MINIMUM METRIC Vmw,j AS CORE USED BY OPTICAL PATH n1

S36 — SELECT WAVELENGTH IN SELECTED CORE

END

FIG. 6

| CORE ID | L1 | L2 | L3 | L4 | L5 | L6 | L7 | L8 | L9 | L10 | L11 | L12 |
|---|---|---|---|---|---|---|---|---|---|---|---|---|
| | | | | | | NUMBER OF WAVELENGTHS AFTER SETTING OPTICAL PATH 0 | | | | | | |
| F1 | 5 | 6 | 3 | 6 | 7 | 8 | 8 | 3 | 4 | 2 | 1 | 6 |
| F2 | 1 | 2 | 6 | 2 | 1 | 1 | 4 | 6 | 8 | 2 | 1 | 2 |
| F3 | 6 | 4 | 7 | 3 | 2 | 6 | 1 | 5 | 0 | 3 | 2 | 5 |
| F4 | 1 | 1 | 2 | 0 | 8 | 8 | 8 | 0 | 6 | 6 | 3 | 5 |
| F5 | 2 | 3 | 2 | 7 | 4 | 8 | 4 | 7 | 0 | 1 | 8 | 4 |
| F6 | 5 | 0 | 5 | 8 | 7 | 0 | 0 | 3 | 2 | 7 | 8 | 5 |
| F7 | 4 | 1 | 2 | 3 | 3 | 8 | 5 | 8 | 5 | 8 | 2 | 4 |
| VARIANCE V | 3.67 | 3.67 | 3.84 | 7.27 | 6.53 | 10.82 | 8.20 | 6.53 | 7.96 | 6.69 | 8.24 | 1.39 |

FIRST CORE GROUP

SECOND CORE GROUP

FIG. 9

| CORE ID | FIRST POSSIBILITY $V_{nw,j}$ |
|---------|------------------|
| F1 | 6.405 |
| F2 | 6.071 |
| F3 | 6.286 |
| F4 | |
| F5 | 6.167 |
| F6 | 6.381 |
| F7 | 6.310 |

NUMBER OF WAVELENGTHS:
INITIAL STATE: (L1, L2, L5, L10) = (5, 6, 7, 2)@F1, = (1, 2, 1, 2)@F2, = ...
    METRIC CALCULATION F1: CALCULATE $V_{nw,j}$ ASSUMING (L1, L2, L5, L10) = (6, 7, 8, 3)@F1
    METRIC CALCULATION F2: CALCULATE $V_{nw,j}$ ASSUMING (L1, L2, L5, L10) = (2, 3, 2, 3)@F2
    ...

SELECT CORE WITH MINIMUM $V_{nw,j}$ IN METRIC CALCULATION 1 TO X

| CORE ID | OPTICAL PATH n1 FIRST POSSIBILITY | OPTICAL PATH n2 FIRST POSSIBILITY | OPTICAL PATH n2 SECOND POSSIBILITY |
|---|---|---|---|
| F1 | 6. 405 | 6. 190 | 5. 983 |
| F2 | 6. 071 | 6. 119 | 6. 126 |
| F3 | 6. 286 | 6. 048 | 6. 150 |
| F4 |  |  |  |
| F5 | 6. 167 | 6. 048 | 6. 221 |
| F6 | 6. 381 | 6. 190 | 6. 197 |
| F7 | 6. 310 | 6. 119 | 6. 102 |

NUMBER OF WAVELENGTHS FOR FIRST POSSIBLE ROUTE:
INITIAL STATE: (L1, L4, L9) = (5, 6, 4)@F1 = (1, 2, 8)@F2...
  METRIC CALCULATION F1: CALCULATE Vnw ASSUMING (L1, L4, L9) = (6, 7, 5)@F1
  METRIC CALCULATION F2: CALCULATE Vnw ASSUMING (L1, L4, L9) ...
  ...
NUMBER OF WAVELENGTHS FOR SECOND POSSIBLE ROUTE:
  ...
SELECT CORE WITH MINIMUM Vnw IN ABOVE ALL METRICS

FIG. 12

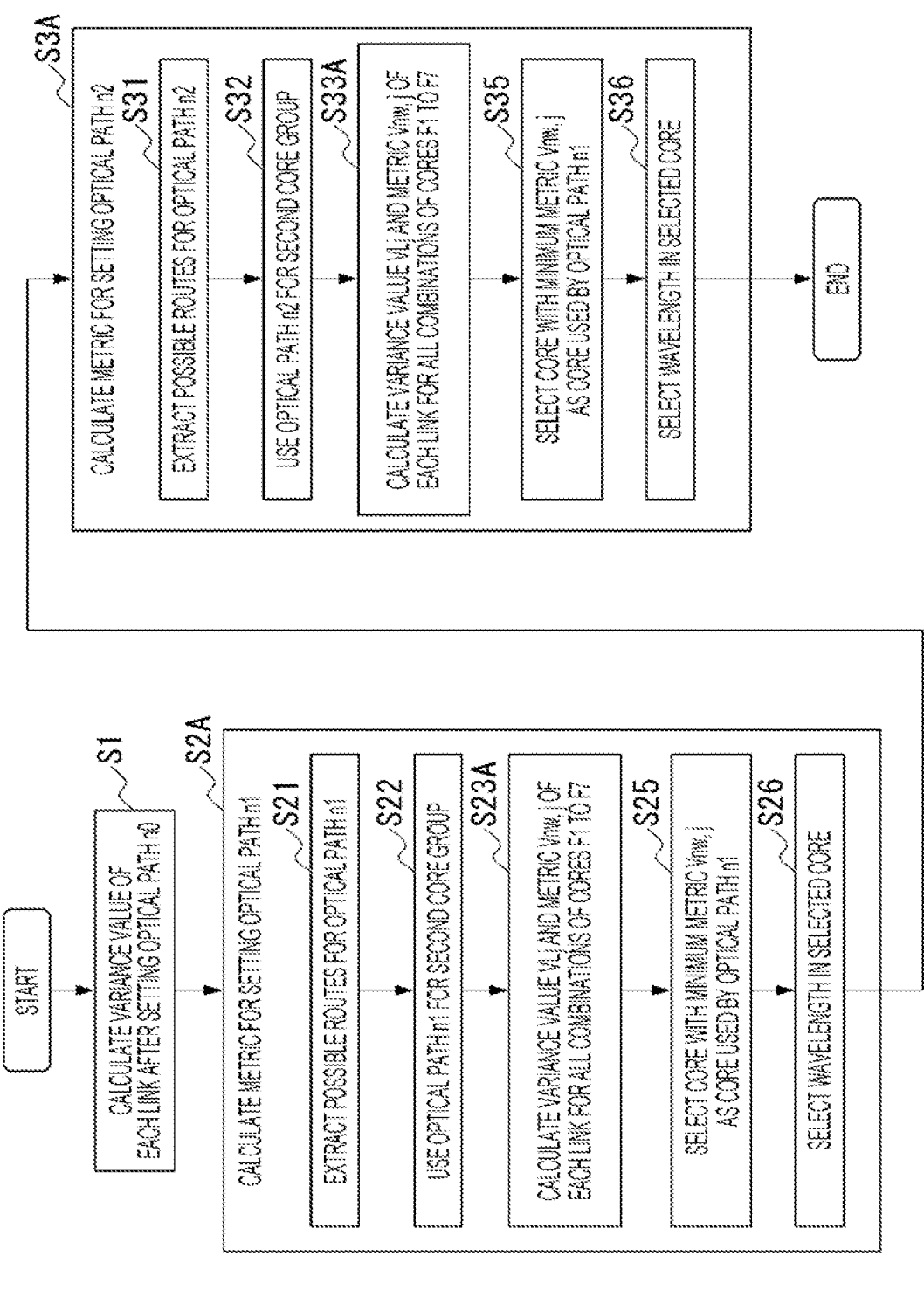

START

CALCULATE VARIANCE VALUE OF EACH LINK AFTER SETTING OPTICAL PATH n0 — S1

S2A

CALCULATE METRIC FOR SETTING OPTICAL PATH n1 — S21

EXTRACT POSSIBLE ROUTES FOR OPTICAL PATH n1 — S22

USE OPTICAL PATH n1 FOR SECOND CORE GROUP — S23A

CALCULATE VARIANCE VALUE VL AND METRIC $V_{max, j}$ OF EACH LINK FOR ALL COMBINATIONS OF CORES F1 TO F7

SELECT CORE WITH MINIMUM METRIC $V_{max, j}$ AS CORE USED BY OPTICAL PATH n1 — S25

SELECT WAVELENGTH IN SELECTED CORE — S26

S3A

CALCULATE METRIC FOR SETTING OPTICAL PATH n2 — S31

EXTRACT POSSIBLE ROUTES FOR OPTICAL PATH n2 — S32

USE OPTICAL PATH n2 FOR SECOND CORE GROUP — S33A

CALCULATE VARIANCE VALUE VL AND METRIC $V_{max, j}$ OF EACH LINK FOR ALL COMBINATIONS OF CORES F1 TO F7

SELECT CORE WITH MINIMUM METRIC $V_{max, j}$ AS CORE USED BY OPTICAL PATH n1 — S35

SELECT WAVELENGTH IN SELECTED CORE — S36

END

FIG. 13

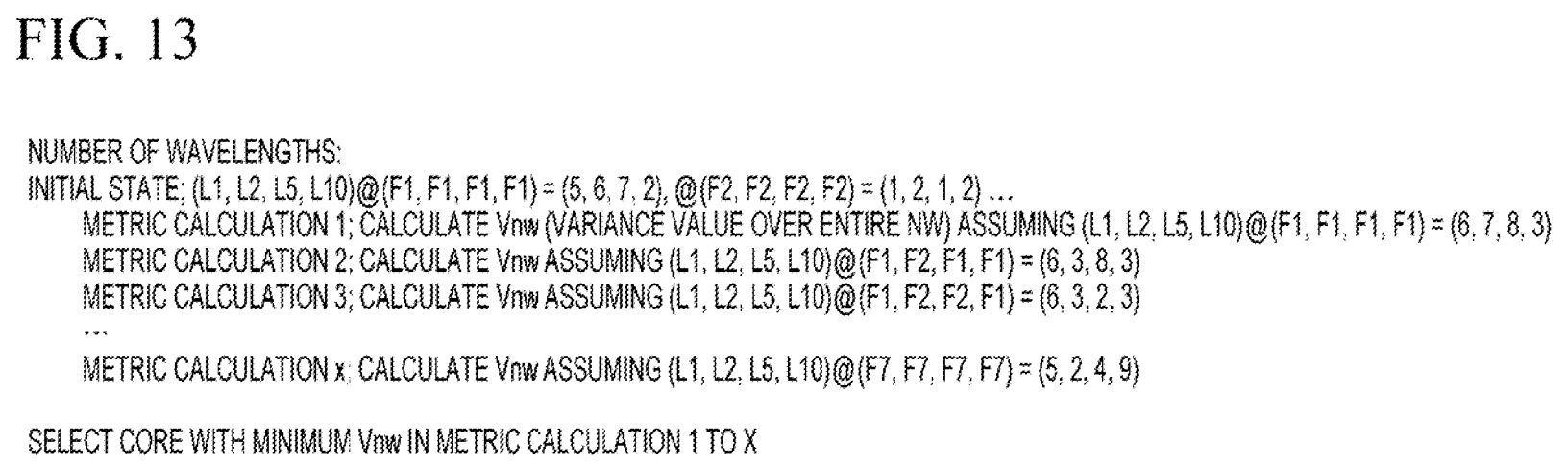

NUMBER OF WAVELENGTHS:

INITIAL STATE: (L1, L2, L5, L10)@(F1, F1, F1, F1) = (5, 6, 7, 2); @(F2, F2, F2, F2) = (1, 2, 1, 2) ...

METRIC CALCULATION 1; CALCULATE Vnw (VARIANCE VALUE OVER ENTIRE NW) ASSUMING (L1, L2, L5, L10)@(F1, F1, F1, F1) = (6, 7, 8, 3)

METRIC CALCULATION 2; CALCULATE Vnw ASSUMING (L1, L2, L5, L10)@(F1, F2, F1, F1) = (6, 3, 8, 3)

METRIC CALCULATION 3; CALCULATE Vnw ASSUMING (L1, L2, L5, L10)@(F1, F2, F2, F1) = (6, 3, 2, 3)

...

METRIC CALCULATION x; CALCULATE Vnw ASSUMING (L1, L2, L5, L10)@(F7, F7, F7, F7) = (5, 2, 4, 9)

SELECT CORE WITH MINIMUM Vnw IN METRIC CALCULATION 1 TO X

FIG. 14

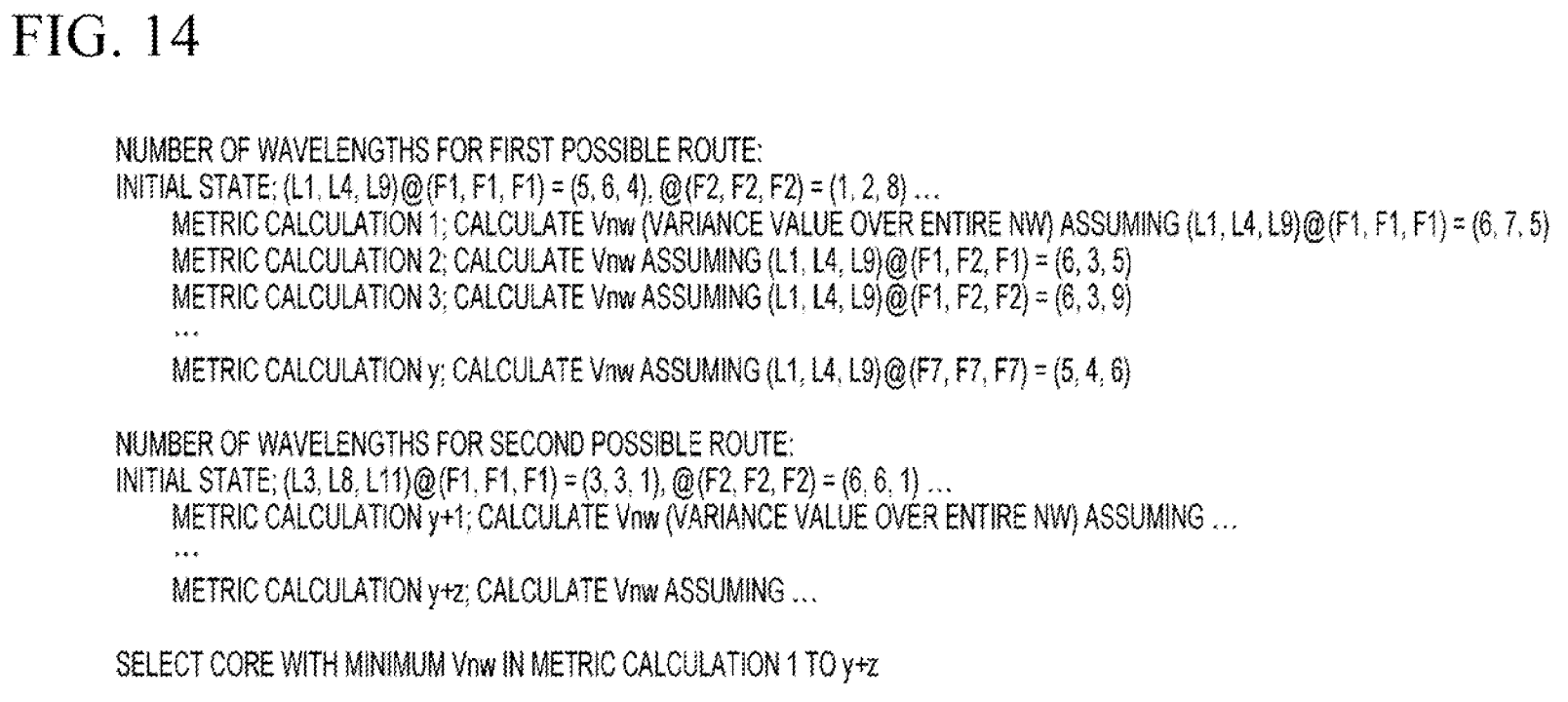

NUMBER OF WAVELENGTHS FOR FIRST POSSIBLE ROUTE:
INITIAL STATE: (L1, L4, L9)@(F1, F1, F1) = (5, 6, 4), @(F2, F2, F2) = (1, 2, 8) …
  METRIC CALCULATION 1; CALCULATE Vnw (VARIANCE VALUE OVER ENTIRE NW) ASSUMING (L1, L4, L9)@(F1, F1, F1) = (6, 7, 5)
  METRIC CALCULATION 2; CALCULATE Vnw ASSUMING (L1, L4, L9)@(F1, F2, F1) = (6, 3, 5)
  METRIC CALCULATION 3; CALCULATE Vnw ASSUMING (L1, L4, L9)@(F1, F2, F2) = (6, 3, 9)
  …
  METRIC CALCULATION y; CALCULATE Vnw ASSUMING (L1, L4, L9)@(F7, F7, F7) = (5, 4, 6)

NUMBER OF WAVELENGTHS FOR SECOND POSSIBLE ROUTE:
INITIAL STATE: (L3, L8, L11)@(F1, F1, F1) = (3, 3, 1), @(F2, F2, F2) = (6, 6, 1) …
  METRIC CALCULATION y+1; CALCULATE Vnw (VARIANCE VALUE OVER ENTIRE NW) ASSUMING …
  …
  METRIC CALCULATION y+z; CALCULATE Vnw ASSUMING …

SELECT CORE WITH MINIMUM Vnw IN METRIC CALCULATION 1 TO y+z

Figure 16:
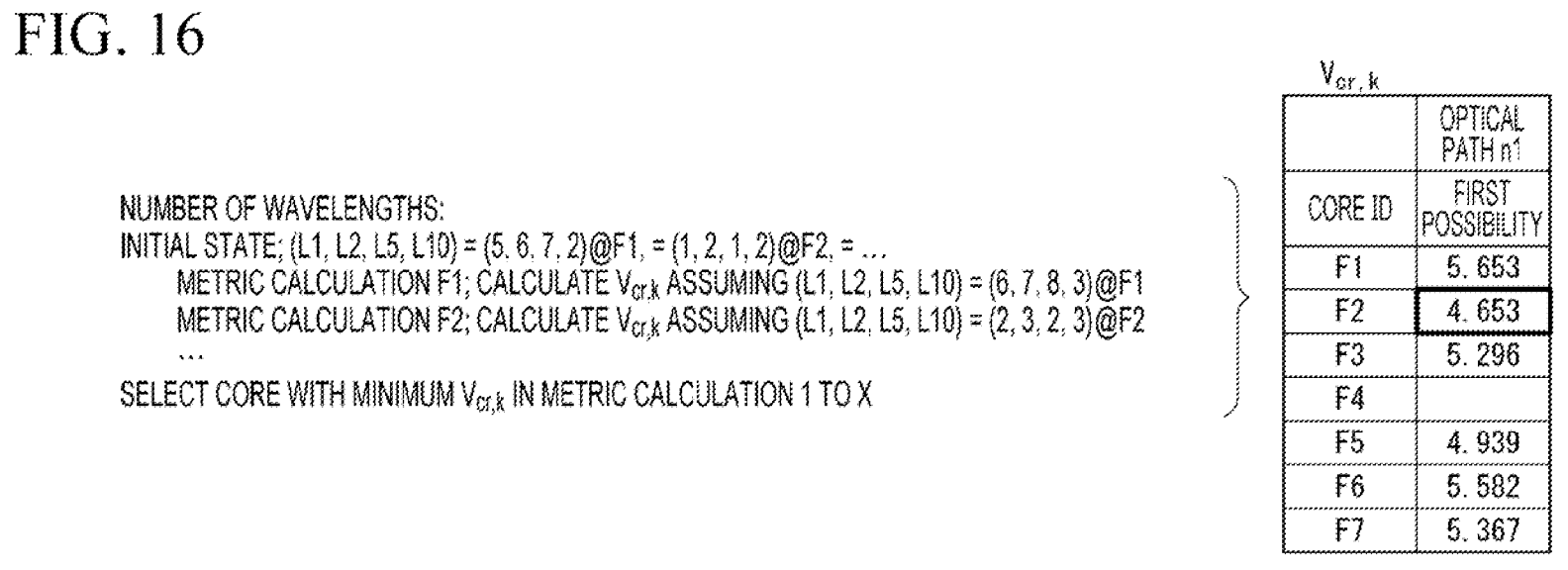

| CORE ID | OPTICAL PATH n1 FIRST POSSIBILITY |
|---------|-----------------------------------|
| F1 | 5.653 |
| F2 | 4.653 |
| F3 | 5.296 |
| F4 | |
| F5 | 4.939 |
| F6 | 5.582 |
| F7 | 5.367 |

NUMBER OF WAVELENGTHS:

INITIAL STATE: (L1, L2, L5, L10) = (5, 6, 7, 2)@F1 = (1, 2, 1, 2)@F2 = ...

METRIC CALCULATION F1; CALCULATE $V_{cr,k}$ ASSUMING (L1, L2, L5, L10) = (6, 7, 8, 3)@F1

METRIC CALCULATION F2; CALCULATE $V_{cr,k}$ ASSUMING (L1, L2, L5, L10) = (2, 3, 2, 3)@F2

...

SELECT CORE WITH MINIMUM $V_{cr,k}$ IN METRIC CALCULATION 1 TO X

| CORE ID | OPTICAL PATH n1 FIRST POSSIBILITY | OPTICAL PATH n2 FIRST POSSIBILITY | SECOND POSSIBILITY |
|---|---|---|---|
| F1 | 5.653 | 6.585 | 5.850 |
| F2 | 4.653 | 6.299 | 6.422 |
| F3 | 5.296 | 6.014 | 6.517 |
| F4 | | | |
| F5 | 4.939 | 6.014 | 6.803 |
| F6 | 5.582 | 6.585 | 6.707 |
| F7 | 5.367 | 6.299 | 6.327 | g201

| CORE ID | L1 | L2 | L3 | L4 | L5 | L6 | L7 | L8 | L9 | L10 | L11 | L12 |
|---|---|---|---|---|---|---|---|---|---|---|---|---|
| F1 | 5 | 6 | 3 | 6 | 7 | 8 | 8 | 3 | 4 | 2 | 1 | 6 |
| F2 | 2 | 3 | 6 | 2 | 2 | 1 | 4 | 6 | 8 | 3 | 1 | 2 |
| F3 | 6 | 4 | 7 | 3 | 2 | 6 | 1 | 5 | 0 | 3 | 2 | 5 |
| F4 | 1 | 1 | 2 | 0 | 8 | 8 | 8 | 0 | 6 | 6 | 3 | 5 |
| F5 | 2 | 3 | 2 | 7 | 4 | 8 | 4 | 7 | 0 | 1 | 8 | 4 |
| F6 | 5 | 0 | 5 | 8 | 7 | 0 | 0 | 3 | 2 | 7 | 8 | 5 |
| F7 | 4 | 1 | 2 | 3 | 3 | 8 | 5 | 8 | 5 | 8 | 2 | 4 |
| VARIANCE V | 3.10 | 3.67 | 3.84 | 7.27 | 5.63 | 10.82 | 8.20 | 6.53 | 7.96 | 6.20 | 8.24 | 1.39 | g202

| CORE ID | L1 | L2 | L3 | L4 | L5 | L6 | L7 | L8 | L9 | L10 | L11 | L12 |
|---|---|---|---|---|---|---|---|---|---|---|---|---|
| F1 | 5 | 6 | 3 | 6 | 7 | 8 | 8 | 3 | 4 | 2 | 1 | 6 |
| F2 | 2 | 3 | 6 | 2 | 2 | 1 | 4 | 6 | 8 | 3 | 1 | 2 |
| F3 | 6 | 4 | 7 | 3 | 2 | 6 | 1 | 5 | 0 | 3 | 2 | 5 |
| F4 | 1 | 1 | 2 | 0 | 8 | 8 | 8 | 0 | 6 | 6 | 3 | 5 |
| F5 | 2 | 3 | 2 | 7 | 4 | 8 | 4 | 7 | 0 | 1 | 8 | 4 |
| F6 | 5 | 0 | 5 | 8 | 7 | 0 | 0 | 3 | 2 | 7 | 8 | 5 |
| F7 | 4 | 1 | 2 | 3 | 3 | 8 | 5 | 8 | 5 | 8 | 2 | 4 |
| VARIANCE V | 3.10 | 3.67 | 3.84 | 7.27 | 5.63 | 10.82 | 8.20 | 6.53 | 7.96 | 6.20 | 8.24 | 1.39 |

FIG. 18

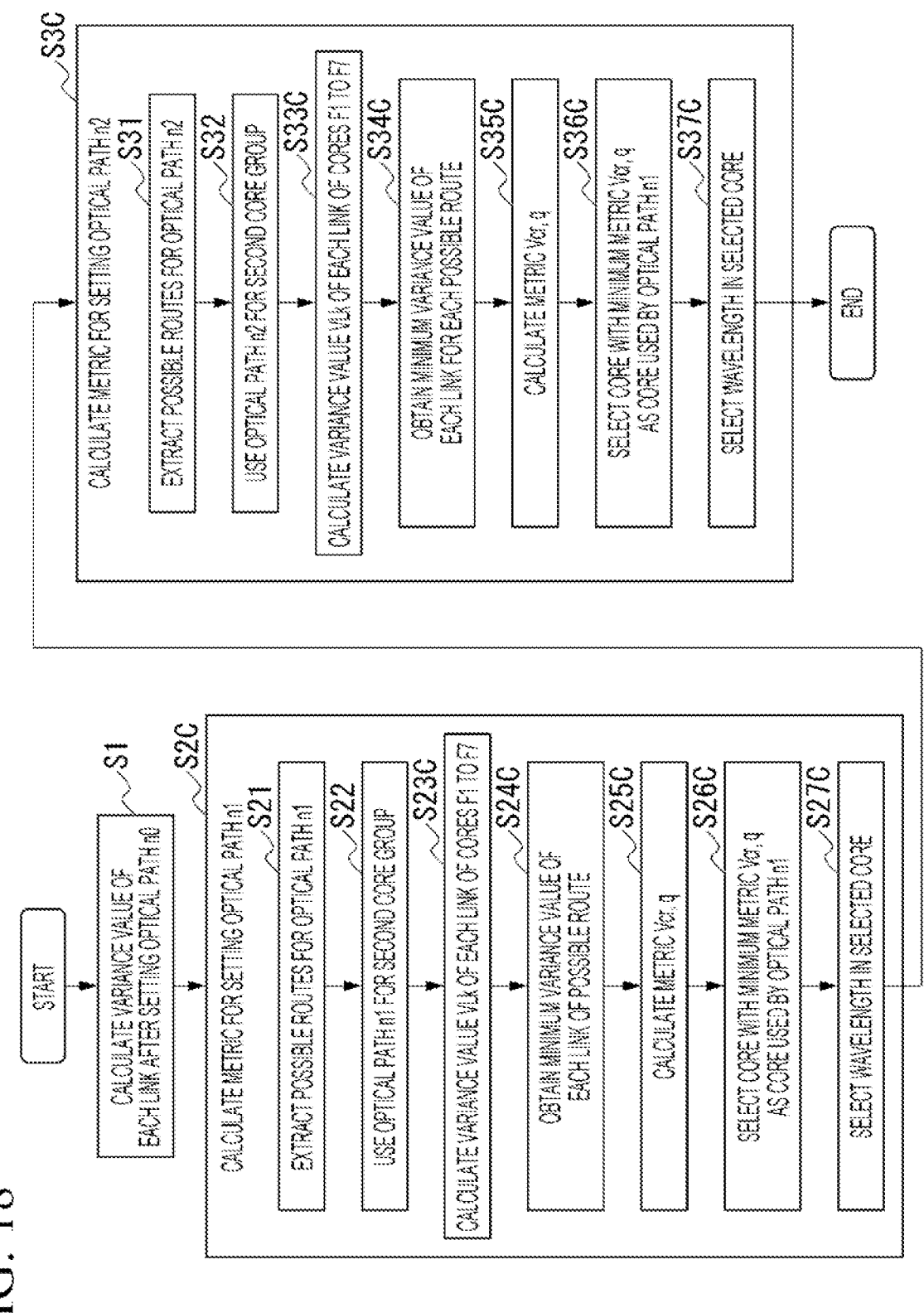

START

S1
CALCULATE VARIANCE VALUE OF EACH LINK AFTER SETTING OPTICAL PATH n0

S2C
CALCULATE METRIC FOR SETTING OPTICAL PATH n1

S21
EXTRACT POSSIBLE ROUTES FOR OPTICAL PATH n1

S22
USE OPTICAL PATH n1 FOR SECOND CORE GROUP

S23C
CALCULATE VARIANCE VALUE VLk OF EACH LINK OF CORES F1 TO F7

S24C
OBTAIN MINIMUM VARIANCE VALUE OF EACH LINK OF POSSIBLE ROUTE

S25C
CALCULATE METRIC Vcr, q

S26C
SELECT CORE WITH MINIMUM METRIC Vcr, q AS CORE USED BY OPTICAL PATH n1

S27C
SELECT WAVELENGTH IN SELECTED CORE

S3C
CALCULATE METRIC FOR SETTING OPTICAL PATH n2

S31
EXTRACT POSSIBLE ROUTES FOR OPTICAL PATH n2

S32
USE OPTICAL PATH n2 FOR SECOND CORE GROUP

S33C
CALCULATE VARIANCE VALUE VLk OF EACH LINK OF CORES F1 TO F7

S34C
OBTAIN MINIMUM VARIANCE VALUE OF EACH LINK FOR EACH POSSIBLE ROUTE

S35C
CALCULATE METRIC Vcr, q

S36C
SELECT CORE WITH MINIMUM METRIC Vcr, q AS CORE USED BY OPTICAL PATH n1

S37C
SELECT WAVELENGTH IN SELECTED CORE

END

FIG. 19

NUMBER OF WAVELENGTHS:

INITIAL STATE: (F1, F2, ..., F7)@L1 = (5, 1, ..., 4), @L2 = ...

METRIC CALCULATION 1: CALCULATE VARIANCE VALUE ASSUMING (F1, F2, ..., F7)@L1 = (6, 1, ..., 4)

METRIC CALCULATION 2: CALCULATE VARIANCE VALUE ASSUMING (F1, F2, ..., F7)@L1 = (5, 2, ..., 4)

...

METRIC CALCULATION x: CALCULATE VARIANCE VALUE ASSUMING (F1, F2, ..., F7)@L1 = (5, 1, ..., 5)

SELECT CORE WITH MINIMUM VARIANCE VALUE IN METRIC CALCULATION 1 TO X

| CORE ID | L1 | L2 | L5 | L10 |
|---------|-------|-------|-------|-------|
| F1 | 4.245 | 4.816 | 7.347 | 6.204 |
| F2 | 3.102 | 3.673 | 5.633 | 6.204 |
| F3 | 4.531 | 4.245 | 5.918 | 6.49 |
| F4 | | | | |
| F5 | 3.388 | 3.959 | 6.490 | 5.918 |
| F6 | 4.245 | 3.102 | 7.347 | 7.633 |
| F7 | 3.959 | 3.388 | 6.204 | 7.918 |

FIG. 20

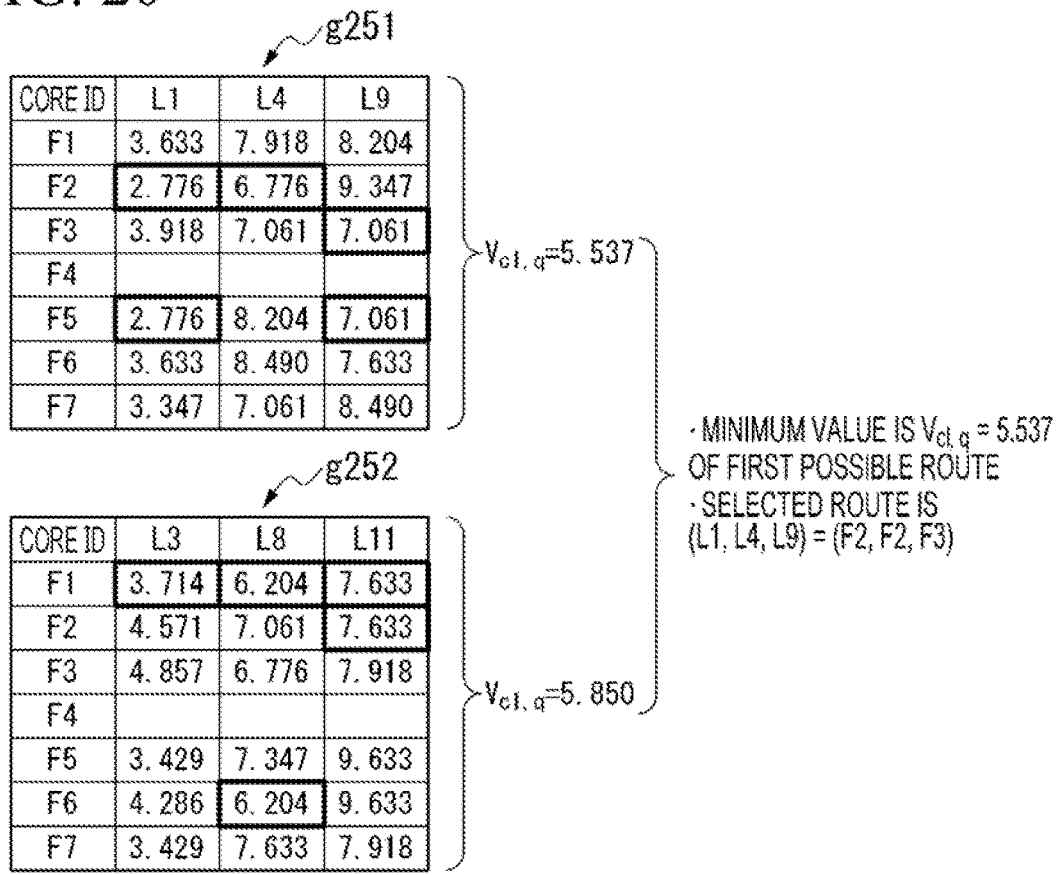

g251

| CORE ID | L1 | L4 | L9 |
|---------|-------|-------|-------|
| F1 | 3.633 | 7.918 | 8.204 |
| F2 | 2.776 | 6.776 | 9.347 |
| F3 | 3.918 | 7.061 | 7.061 |
| F4 | | | |
| F5 | 2.776 | 8.204 | 7.061 |
| F6 | 3.633 | 8.490 | 7.633 |
| F7 | 3.347 | 7.061 | 8.490 |

$V_{c1, q} = 5.537$ g252

| CORE ID | L3 | L8 | L11 |
|---------|-------|-------|-------|
| F1 | 3.714 | 6.204 | 7.633 |
| F2 | 4.571 | 7.061 | 7.633 |
| F3 | 4.857 | 6.776 | 7.918 |
| F4 | | | |
| F5 | 3.429 | 7.347 | 9.633 |
| F6 | 4.286 | 6.204 | 9.633 |
| F7 | 3.429 | 7.633 | 7.918 |

$V_{cl, q} = 5.850$

· MINIMUM VALUE IS $V_{cl, q}$ = 5.537
OF FIRST POSSIBLE ROUTE
· SELECTED ROUTE IS
(L1, L4, L9) = (F2, F2, F3)

FIG. 22

| CORE ID | L1 | L2 | L3 | L4 | L5 | L6 | L7 | L8 | L9 | L10 | L11 | L12 | AVERAGE VALUE OF USED WAVELENGTHS |
|---|---|---|---|---|---|---|---|---|---|---|---|---|---|
| F1 | 5 | 6 | 3 | 6 | 7 | 8 | 8 | 3 | 4 | 2 | 1 | 6 | 4.92 |
| F2 | 1 | 2 | 6 | 2 | 1 | 1 | 4 | 6 | 8 | 2 | 1 | 2 | 3.00 |
| F3 | 6 | 4 | 7 | 3 | 2 | 6 | 1 | 5 | 0 | 3 | 2 | 5 | 3.67 |
| F4 | 1 | 1 | 2 | 0 | 8 | 8 | 8 | 0 | 6 | 6 | 3 | 5 | 4.00 |
| F5 | 2 | 3 | 2 | 7 | 4 | 8 | 4 | 7 | 0 | 1 | 8 | 4 | 4.17 |
| F6 | 5 | 0 | 5 | 8 | 7 | 0 | 0 | 3 | 2 | 7 | 8 | 5 | 4.17 |
| F7 | 4 | 1 | 2 | 3 | 3 | 8 | 5 | 8 | 5 | 8 | 2 | 4 | 4.42 |

FIG. 23
g301
| CORE ID | L1 | L2 | L3 | L4 | L5 | L6 | L7 | L8 | L9 | L10 | L11 | L12 | AVERAGE VALUE OF USED WAVELENGTHS |
|---|---|---|---|---|---|---|---|---|---|---|---|---|---|
| F1 | 5 | 6 | 3 | 6 | 7 | 8 | 8 | 3 | 4 | 2 | 1 | 6 | 4.92 |
| F2 | 2 | 3 | 6 | 2 | 2 | 1 | 4 | 6 | 8 | 3 | 1 | 2 | 3.33 |
| F3 | 6 | 4 | 7 | 3 | 2 | 6 | 1 | 5 | 0 | 3 | 2 | 5 | 3.67 |
| F4 | 1 | 1 | 2 | 0 | 8 | 8 | 8 | 0 | 6 | 6 | 3 | 5 | 4.00 |
| F5 | 2 | 3 | 2 | 7 | 4 | 8 | 4 | 7 | 0 | 1 | 8 | 4 | 4.17 |
| F6 | 5 | 0 | 5 | 8 | 7 | 0 | 0 | 3 | 2 | 7 | 8 | 5 | 4.17 |
| F7 | 4 | 1 | 2 | 3 | 3 | 8 | 5 | 8 | 5 | 8 | 2 | 4 | 4.42 |
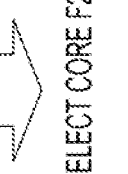 SELECT CORE F2
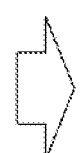
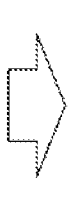 SELECT SECOND POSSIBLE ROUTE
SELECTION OF POSSIBLE ROUTES
NUMBER OF EMPTY WAVELENGTHS@F2: FIRST POSSIBLE ROUTE (L1, L4, L9) = (8, 8, 2) → MINIMUM VALUE OF EMPTY WAVELENGTHS: 2
NUMBER OF EMPTY WAVELENGTHS@F2: SECOND POSSIBLE ROUTE (L3, L8, L11) = (4, 4, 9) → MINIMUM VALUE OF EMPTY WAVELENGTHS: 4

FIG. 24

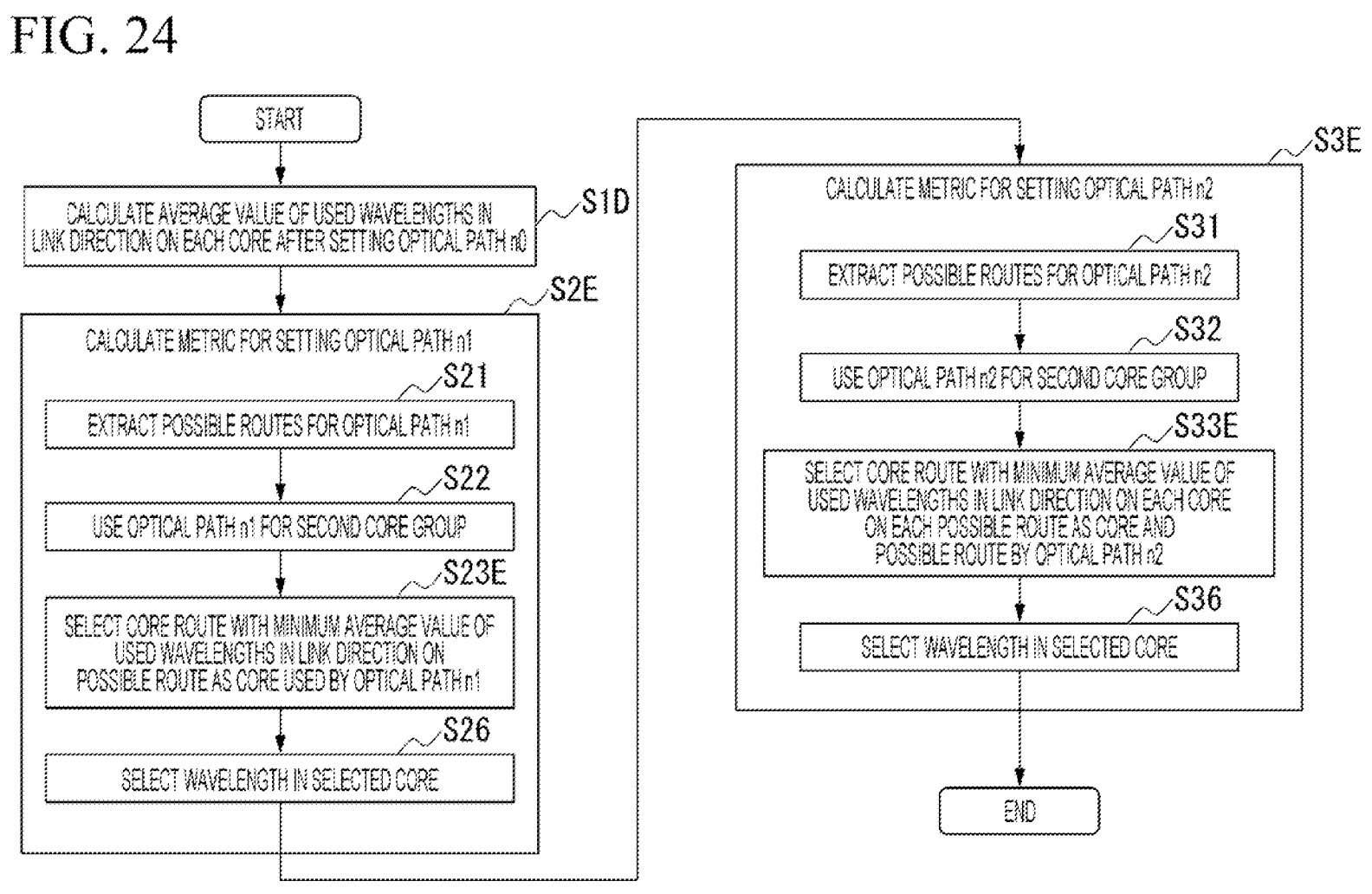

START

S1D — CALCULATE AVERAGE VALUE OF USED WAVELENGTHS IN LINK DIRECTION ON EACH CORE AFTER SETTING OPTICAL PATH n0

S2E

CALCULATE METRIC FOR SETTING OPTICAL PATH n1

S21 — EXTRACT POSSIBLE ROUTES FOR OPTICAL PATH n1

S22 — USE OPTICAL PATH n1 FOR SECOND CORE GROUP

S23E — SELECT CORE ROUTE WITH MINIMUM AVERAGE VALUE OF USED WAVELENGTHS IN LINK DIRECTION ON POSSIBLE ROUTE AS CORE USED BY OPTICAL PATH n1

S26 — SELECT WAVELENGTH IN SELECTED CORE

S3E

CALCULATE METRIC FOR SETTING OPTICAL PATH n2

S31 — EXTRACT POSSIBLE ROUTES FOR OPTICAL PATH n2

S32 — USE OPTICAL PATH n2 FOR SECOND CORE GROUP

S33E — SELECT CORE ROUTE WITH MINIMUM AVERAGE VALUE OF USED WAVELENGTHS IN LINK DIRECTION ON EACH CORE ON EACH POSSIBLE ROUTE AS CORE AND POSSIBLE ROUTE BY OPTICAL PATH n2

S36 — SELECT WAVELENGTH IN SELECTED CORE

END

FIG. 25

| CORE ID | L1 | L2 | L3 | L4 | L5 | L6 | L7 | L8 | L9 | L10 | L11 | L12 | AVERAGE VALUE OF USED WAVELENGTHS |
|---------|----|----|----|----|----|----|----|----|----|-----|-----|-----|-----------------------------------|
| F1 | 5 | 6 | 3 | 6 | 7 | 8 | 8 | 3 | 4 | 2 | 1 | 6 | 5.00 |
| F2 | 1 | 2 | 6 | 2 | 1 | 1 | 4 | 6 | 8 | 2 | 1 | 2 | 1.50 |
| F3 | 6 | 4 | 7 | 3 | 2 | 6 | 1 | 5 | 0 | 3 | 2 | 5 | 3.75 |
| F4 | 1 | 1 | 2 | 0 | 8 | 8 | 8 | 0 | 6 | 6 | 3 | 5 | 4.00 |
| F5 | 2 | 3 | 2 | 7 | 4 | 8 | 4 | 7 | 0 | 1 | 8 | 4 | 2.50 |
| F6 | 5 | 0 | 5 | 8 | 7 | 0 | 0 | 3 | 2 | 7 | 8 | 5 | 4.75 |
| F7 | 4 | 1 | 2 | 3 | 3 | 8 | 5 | 8 | 5 | 8 | 2 | 4 | 4.00 |

FIG. 26 g351

| CORE ID | L1 | L2 | L3 | L4 | L5 | L6 | L7 | L8 | L9 | L10 | L11 | L12 | AVERAGE VALUE OF USED WAVELENGTHS |
|---|---|---|---|---|---|---|---|---|---|---|---|---|---|
| F1 | 5 | 6 | 3 | 6 | 7 | 8 | 8 | 3 | 4 | 2 | 1 | 6 | 5.00 |
| F2 | 2 | 3 | 6 | 2 | 2 | 1 | 4 | 6 | 8 | 3 | 1 | 2 | 4.00 |
| F3 | 6 | 4 | 7 | 3 | 2 | 6 | 1 | 5 | 0 | 3 | 2 | 5 | 3.00 |
| F4 | 1 | 1 | 2 | 0 | 8 | 8 | 8 | 0 | 6 | 6 | 3 | 5 |  |
| F5 | 2 | 3 | 2 | 7 | 4 | 8 | 4 | 7 | 0 | 1 | 8 | 4 | 3.00 |
| F6 | 5 | 0 | 5 | 8 | 7 | 0 | 0 | 3 | 2 | 7 | 8 | 5 | 5.00 |
| F7 | 4 | 1 | 2 | 3 | 3 | 8 | 5 | 8 | 5 | 8 | 2 | 4 | 4.00 | g352

| CORE ID | L1 | L2 | L3 | L4 | L5 | L6 | L7 | L8 | L9 | L10 | L11 | L12 | AVERAGE VALUE OF USED WAVELENGTHS |
|---|---|---|---|---|---|---|---|---|---|---|---|---|---|
| F1 | 5 | 6 | 3 | 6 | 7 | 8 | 8 | 3 | 4 | 2 | 1 | 6 | 2.33 |
| F2 | 2 | 3 | 6 | 2 | 2 | 1 | 4 | 6 | 8 | 3 | 1 | 2 | 4.33 |
| F3 | 6 | 4 | 7 | 3 | 2 | 6 | 1 | 5 | 0 | 3 | 2 | 5 | 4.67 |
| F4 | 1 | 1 | 2 | 0 | 8 | 8 | 8 | 0 | 6 | 6 | 3 | 5 |  |
| F5 | 2 | 3 | 2 | 7 | 4 | 8 | 4 | 7 | 0 | 1 | 8 | 4 | 5.67 |
| F6 | 5 | 0 | 5 | 8 | 7 | 0 | 0 | 3 | 2 | 7 | 8 | 5 | 5.33 |
| F7 | 4 | 1 | 2 | 3 | 3 | 8 | 5 | 8 | 5 | 8 | 2 | 4 | 4.00 |

SELECT CORE F1 AND SECOND POSSIBLE ROUTE

RANDOMLY SELECT CORE
IN SECOND CORE GROUP

Fx : CORE ID

⊗ : NUMBER OF USED WAVELENGTHS

▨ : FIRST CORE GROUP

◯ : SECOND CORE GROUP

START

S71

EXTRACT POSSIBLE ROUTES FOR OPTICAL PATH n1

S72

USE OPTICAL PATH n1 FOR SECOND CORE GROUP

S71

RANDOMLY SELECT CORE FROM SECOND CORE GROUP

S74

SELECT WAVELENGTH INSIDE SELECTED CORE

END

FIG. 31

| COMBINATION NUMBER | POSSIBLE ROUTE NUMBER | LINK | CORE | SETTING PATH NUMBER |
|---|---|---|---|---|
| 1 | FIRST POSSIBLE ROUTE | (L1, L2, L5, L10) | (F1, F1, F1, F1) | 12 |
| 2 | FIRST POSSIBLE ROUTE | (L1, L2, L5, L10) | (F2, F2, F2, F2) | 1 |
| 3 | FIRST POSSIBLE ROUTE | (L1, L2, L5, L10) | (F3, F3, F3, F3) | 17 |
| 4 | FIRST POSSIBLE ROUTE | (L1, L2, L5, L10) | (F5, F5, F5, F5) | |
| 5 | FIRST POSSIBLE ROUTE | (L1, L2, L5, L10) | (F6, F6, F6, F6) | |
| 6 | FIRST POSSIBLE ROUTE | (L1, L2, L5, L10) | (F7, F7, F7, F7) | 16 |

FIG. 32

| COMBINATION NUMBER | POSSIBLE ROUTE NUMBER | LINK | CORE | SETTING PATH NUMBER |
|---|---|---|---|---|
| 1 | FIRST POSSIBLE ROUTE | (L1, L2, L5, L10) | (F1, F1, F1, F1) | 12 |
| 2 | FIRST POSSIBLE ROUTE | (L1, L2, L5, L10) | (F2, F2, F2, F2) | 1 |
| 3 | FIRST POSSIBLE ROUTE | (L1, L2, L5, L10) | (F3, F3, F3, F3) | 17 |
| 4 | FIRST POSSIBLE ROUTE | (L1, L2, L5, L10) | (F5, F5, F5, F5) | 22 |
| 5 | FIRST POSSIBLE ROUTE | (L1, L2, L5, L10) | (F6, F6, F6, F6) | 30 |
| 6 | FIRST POSSIBLE ROUTE | (L1, L2, L5, L10) | (F7, F7, F7, F7) | 16 |

FIG. 33

| COMBINATION NUMBER | POSSIBLE ROUTE NUMBER | LINK | CORE | SETTING PATH NUMBER |
|---|---|---|---|---|
| 1 | FIRST POSSIBLE ROUTE | (L1, L2, L5, L10) | (F1, F1, F1, F1) | 12 |
| 2 | FIRST POSSIBLE ROUTE | (L1, L2, L5, L10) | (F2, F2, F2, F2) | 1 |
| 3 | FIRST POSSIBLE ROUTE | (L1, L2, L5, L10) | (F3, F3, F3, F3) | 17 |
| 4 | FIRST POSSIBLE ROUTE | (L1, L2, L5, L10) | (F5, F5, F5, F5) | |
| ... | ... | ... | ... | ... |
| Z | FIRST POSSIBLE ROUTE | (L1, L2, L5, L10) | (F7, F7, F7, F7) | 16 |

FIG. 34

| COMBINATION NUMBER | POSSIBLE ROUTE NUMBER | LINK | CORE | SETTING PATH NUMBER |
|---|---|---|---|---|
| 1 | FIRST POSSIBLE ROUTE | (L1, L2, L5, L10) | (F1, F1, F1, F1) | 12 |
| 2 | FIRST POSSIBLE ROUTE | (L1, L2, L5, L10) | (F2, F2, F2, F2) | 1 |
| 3 | FIRST POSSIBLE ROUTE | (L1, L2, L5, L10) | (F3, F3, F3, F3) | 17 |
| 4 | FIRST POSSIBLE ROUTE | (L1, L2, L5, L10) | (F5, F5, F5, F5) | 3 |
| ... | ... | ... | ... | ... |
| Z | FIRST POSSIBLE ROUTE | (L1, L2, L5, L10) | (F7, F7, F7, F7) | 16 |

COMMUNICATION ROUTE ALLOCATION DEVICE, COMMUNICATION ROUTE ALLOCATION METHOD, AND PROGRAM

CROSS-REFERENCE TO RELATED APPLICATIONS

This application is a 371 U.S. National Phase of International Application No. PCT/JP2021/019366, filed on May 21, 2021. The entire disclosure of the above application is incorporated herein by reference.

TECHNICAL FIELD

The present invention relates to techniques for a communication route allocation device, a communication route allocation method, and a program.

BACKGROUND ART

In response to increases in traffic, utilization of multicore fibers, multimode fibers, few-mode fibers, multicore-multimode fibers, and the like based on spatial division multiplexing multiplexing (SDM) in optical networks has been studied. For example, it is possible to simultaneously transmit data by splitting the data into a plurality of cores using a multicore fiber. In a case where optical signals having the same spectrum are transmitted via adjacent cores using the multicore fiber, these signals are strongly affected by inter-core crosstalk. An optical path accommodation design technique, which is one technique for controlling a spatial multiplexing optical network system (SDM-NW) in consideration of such an influence, is also an important technique to realize the SDM-NW. Therefore, a method for allocating cores in consideration of crosstalk using a crosstalk model has been proposed as an optical path accommodation designing technique for a multicore fiber (see Non Patent Literature 1, for example).

CITATION LIST

Non Patent Literature

Non Patent Literature 1: Shohei Pujii, Yusuke Hirota, "On-Demand Spectrum and Core Allocation for Multi-Core Fibers in Elastic Optical Network", Optical Fiber Communication Conference and Exposition and the National Fiber Optic Engineers Conference (OFC/NFOEC), 10.1364/OFC.2013.OTh4B.4, 2013

SUMMARY OF INVENTION

Technical Problem

However, the related art has a problem that the amount of power in spatial multiplexing optical amplifier (multicore optical amplifier), which is one element configuring the spatial multiplexing optical network system (SDM-NW), is not taken into consideration.

In view of the aforementioned circumstances, an object of the present invention is to provide a technique for enabling the amount of power of a spatial multiplexing optical amplifier (multicore optical amplifier) configuring an SDM-NW to be reduced over the entire network.

Solution to Problem

An aspect of the present invention is a communication route allocation device including: a route possibility extraction unit configured to extract connectable possible routes on the basis of utilization condition information of a network from among optical path routes connecting start points to end points of optical paths accommodating communication demand in the network; a core selection unit configured to select a core, a link, and the optical path route to accommodate the optical paths by leveling wavelength utilization conditions over the entire network on the basis of utilization condition information of multicore fibers of all links in the network or the possible routes; and a wavelength selection unit configured to select a wavelength to be used for the core, the link, and the optical path route selected by the route possibility extraction unit and the core selection unit.

An aspect of the present invention is a communication route allocation method including: extracting connectable possible routes on the basis of utilization condition information of a network from among optical path routes connecting start points to end points of optical paths accommodating communication demand in the network; selecting a core, a link, and an optical path route to accommodate optical paths by leveling wavelength utilization conditions over the entire network on the basis of utilization condition information of multicore fibers of all links in the network or the possible routes; and selecting a wavelength to be used for the selected core, the link, and the optical path route.

An aspect of the present invention is a program that causes a computer to function as the above communication route allocation device.

Advantageous Effects of Invention

According to the present invention, it is possible to reduce the amount of power of a spatial multiplexing optical amplifier (multicore optical amplifier) configuring a spatial multiplexing optical network system (SDM-NW) over the entire network.

BRIEF DESCRIPTION OF DRAWINGS

FIG. 5 is a flowchart for a processing procedure example according to a first embodiment.

FIG. 6 is a diagram illustrating the number of used wavelengths and a variance value on each link based on a core ID and a link ID after setting of an optical path no.

FIG. 9 is a diagram illustrating an example of processing in step S2 according to the first embodiment.

FIG. 11 is a diagram illustrating an example of processing in step S3 according to the first embodiment.

FIG. 12 is a flowchart for a processing procedure example according to a second embodiment.

FIG. 13 is a diagram illustrating an example of processing in step S2A according to the second embodiment.

FIG. 14 is a diagram illustrating an example of processing in step S3A according to a third embodiment.

FIG. 16 is a diagram illustrating an example of processing in step S2B according to the third embodiment.

FIG. 17 is a diagram illustrating an example of processing in step S3B according to the third embodiment.

FIG. 18 is a flowchart for a processing procedure example according to a fourth embodiment.

FIG. 19 is a diagram illustrating an example of processing in step S2C according to the fourth embodiment.

FIG. 20 is a diagram illustrating an example of processing in step S3C according to the fourth embodiment.

FIG. 22 is a diagram illustrating an example of an average value of used wavelengths in a link direction on each core after setting an optical path n0 according to the fifth embodiment.

FIG. 23 is a diagram illustrating an example of processing in step S3D according to the fifth embodiment.

FIG. 24 is a flowchart for a processing procedure example according to a sixth embodiment.

FIG. 25 is a diagram illustrating an example of an average value of used wavelengths in a link direction on each core after setting an optical path n0 according to the sixth embodiment.

FIG. 26 is a diagram illustrating an example of processing in step S3E according to the sixth embodiment.

FIG. 31 is a diagram for explaining a processing example in which there is a core continuity restriction and a minimum combination number out of combination numbers for which no optical paths have been set is selected from among combination numbers that satisfy a wavelength continuity restriction and the core continuity restriction.

FIG. 32 is a diagram for explaining a processing example in which there is a core continuity restriction and the next combination number for which the maximum optical path number has been set is selected from among the combination numbers that satisfy a wavelength continuity restriction and the core continuity restriction.

FIG. 33 is a diagram for explaining a processing example in which there is no core continuity restriction and a minimum combination number out of combination numbers for which no optical paths have been set is selected from among combination numbers that satisfy a wavelength continuity restriction and the core continuity restriction.

FIG. 34 is a diagram for explaining a processing example in which there is a core continuity restriction and the next combination number for which the maximum optical path number has been set is selected from among combination numbers that satisfy a wavelength continuity restriction and the core continuity restriction.

DESCRIPTION OF EMBODIMENTS

Embodiments of the present invention will be described in detail with reference to the drawings.

Figure 1:
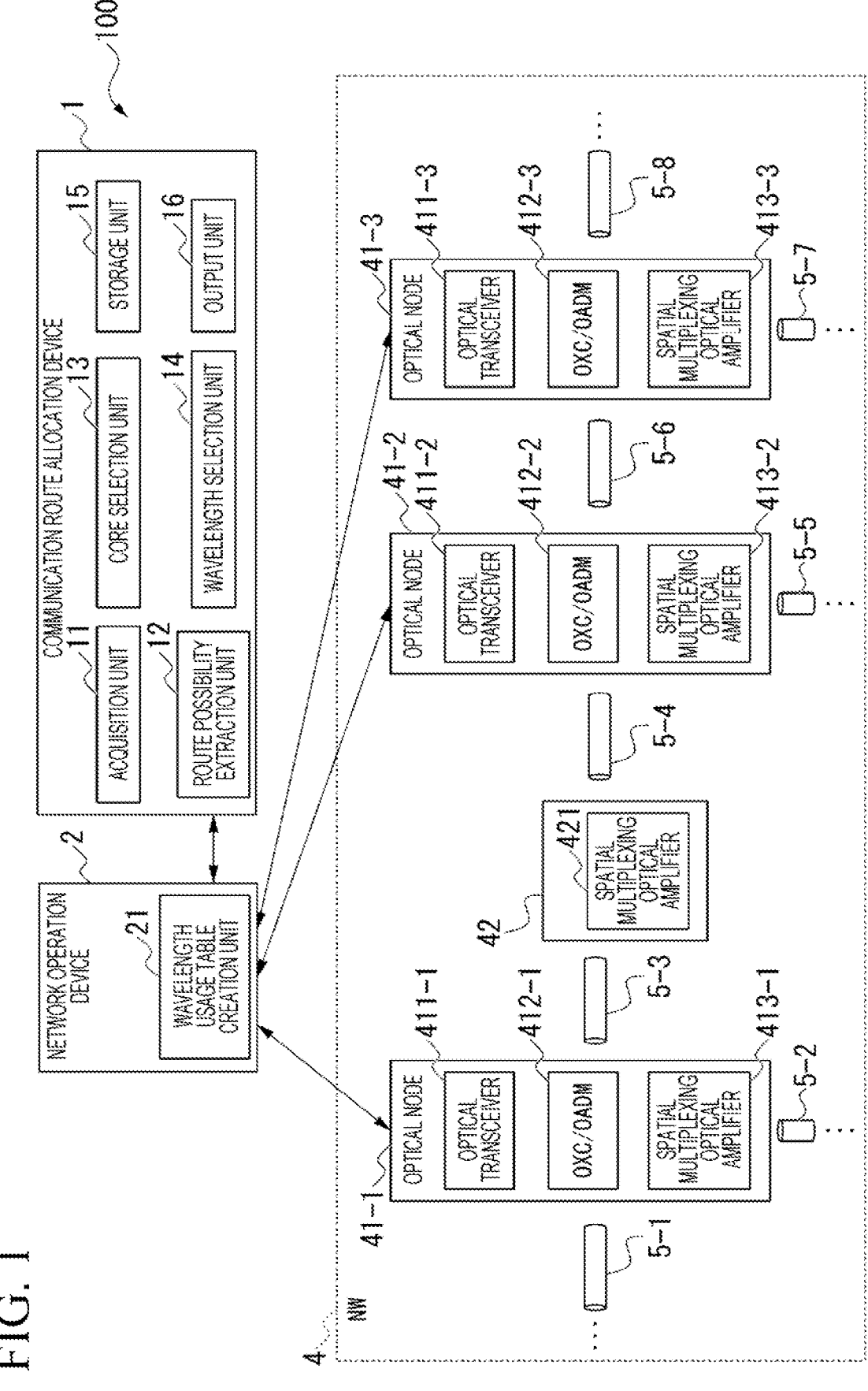
FIG. 1 is a diagram illustrating a configuration example of an SDM optical network including a communication route allocation device according to the present invention.

FIG. 1 is a diagram illustrating a configuration example of an SDM optical network including a communication route allocation device according to the present invention. As illustrated in FIG. 1, an SDM optical network 100 includes, for example, a communication route allocation device 1, a network operation device 2, and a network (NW) 4. The communication route allocation device 1 includes, for example, an acquisition unit 11, a route possibility extraction unit 12, a core selection unit 13, a wavelength selection unit 14, a storage unit 15, and an output unit 16. The network operation device 2 includes, for example, a wavelength usage table creation unit 21. The NW 4 includes, for example, multicore fibers 5 (5-1, 5-2, 5-3, 5-4, 5-5, 5-6, 5-7, 5-8, . . . ), optical nodes 41 (41-1, 41-2, 41-3, . . . ), and an optical repeater 42. Each optical node 41 includes, for example, an optical transceiver 411, an OXC/OADM 412, and a spatial multiplexing optical amplifier 413. The optical repeater 42 includes, for example, a spatial multiplexing optical amplifier 421. Note that the configuration of the NW 4 illustrated in FIG. 1 is an example and the numbers of the multicore fibers 5, the optical nodes 41, and the like and the configuration of the optical nodes 41 are not limited thereto. Also, the communication route allocation device 1 may be included in the network operation device 2. Note that the wavelength usage table creation unit 21 may be included in the communication route allocation device 1.

Note that, in the following description, the optical nodes 41-1, 41-2, 41-3, . . . will be referred to as optical nodes 41 unless one of them is to be specified. Also, the optical transceivers 411-1, 411-2, 411-3, . . . will be referred to as optical transceivers 411 unless one of them is to be specified. The OXC/OADM 412-1, 412-2, 412-3, . . . will be referred to as OXC/OADMs 412 unless one of them is to be specified. The spatial multiplexing optical amplifiers 413-1, 413-2, 413-3, . . . will be referred to as spatial multiplexing optical amplifiers 413 unless one of them is to be specified. The multicore fibers 5-1, 5-2, 5-3, 5-4, 5-5, 5-6, 5-7, 5-8, . . . will be referred to as multicore fibers 5 unless one of them is to be specified.

The network operation device 2 manages, monitors, and controls each optical node. The network operation device 2 creates and manages a wavelength usage table. The wavelength usage table creation unit 21 creates a wavelength usage table based on core IDs (identification information) and link IDs (identification information). More specifically, the wavelength usage table creation unit 21 stores route information (optical path routes, links, cores of multicore fibers) of optical paths to be set (or that have been set) and wavelength information and creates the wavelength usage table.

The optical nodes 41 perform amplification and predetermined processing on optical signals to be transmitted and received.

The optical transceivers 411 transmit and receive optical signals via the multicore fibers 5.

The OXC/OADMs 412 have functions of optical cross connect (OXC) devices and optical add drop multiplex (OADM) devices.

The spatial multiplexing optical amplifiers (413 or 421) are multicore optical amplifiers. The spatial multiplexing optical amplifiers (413 or 421) include clad excitation lasers that collectively excite all cores of the multicore fibers 5 or may include both the clad excitation lasers and core excitation lasers that individually excite each core. The spatial multiplexing optical amplifiers (413 or 421) amplify optical signals to be transmitted in accordance with the number of wavelengths (the number of optical paths) to be accommodated in each core of the multicore fibers 5 on the basis of information (optical path routes, links, cores, wavelengths) output by the communication route allocation device 1.

The communication route allocation device 1 determines optical path routes, links, cores, and wavelengths such that the number of set wavelengths of cores to be used is leveled in optical path design at the time of a request for establishing connection of the optical paths in consideration of a power saving property of the multicore optical amplifiers configuring the SDM-NW using the wavelength usage table created by the network operation device 2.

The acquisition unit 11 acquires the wavelength usage table based on the core IDs and the link IDs from the network operation device 2 and causes the storage unit 15 to store the acquired wavelength usage table based on the core IDs and the link IDs.

The route possibility extraction unit 12 extracts connectable route possibilities on the basis of network utilization condition information from among optical path routes connecting start points to end points of optical paths that accommodate communication demand in the network (NW) 3. More specifically, the route possibility extraction unit 12 selects an optical path route that allows utilization of the same wavelength for all the links and the cores configuring the route possibilities (that satisfies a wavelength continuity restriction) on the basis of the network utilization condition information from among the possible routes by a well-known method. Moreover, the route possibility extraction unit 12 calculates, as an optical path route, a route that allows utilization of the same core for all the links configuring the route possibilities (that satisfies a core continuity restriction) or a route that does not use the same core for all the links configuring the route possibilities (that does not depend on the core continuity restriction). The route possibility extraction unit 12 calculates the optical path route that allows utilization of the same core for all the links configuring the route possibilities in a case where the core continuity restriction is applied, or calculates, as optical path routes, routes as all combinations of all links configuring the route possibilities and all cores thereof in a case where the core continuity restriction is not applied.

The core selection unit 13 determines a core and a link to accommodate the optical paths to level the wavelength utilization conditions over the entire network and determines an optical path route, on the basis of the utilization condition information of the multicore fibers 5 of all the links in the network or the route possibilities. Note that processing performed by the core selection unit 13 will be described in each embodiment.

The wavelength selection unit 14 determines a wavelength to be used for the optical path route calculated by the route possibility extraction unit 12 and the core selection unit 13. More specifically, the wavelength selection unit 14 selects a wavelength that maximizes wavelength utilization efficiency over the entire network on the basis of the network utilization condition information from among the possible routes calculated by a well-known method.

The storage unit 15 stores information acquired by the acquisition unit 11 and information extracted, calculated, or selected by each of the route possibility extraction unit 12, the core selection unit 13, and the wavelength selection unit 14. The storage unit 15 stores an equation used for extraction, calculation, or selection by each of the route possibility extraction unit 12, the core selection unit 13, and the wavelength selection unit 14.

The output unit 16 outputs the optical path route, the link, and the core determined by the core selection unit 13 and information regarding the wavelength determined by the wavelength selection unit 14 to the spatial multiplexing optical amplifiers (413 or 421) via the network operation device 2 and the optical nodes 41.

Note that the communication route allocation device 1 is configured using a processor such as a central processing unit (CPU) and a memory. The communication route allocation device 1 functions as, for example, the acquisition unit 11, the route possibility extraction unit 12, the core selection unit 13, the wavelength selection unit 14, and the output unit 16 by the processor executing a program. Note that all or some of the functions of the communication route allocation device 1 may be implemented by use of hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, a CD-ROM, or a semiconductor storage device (e.g., a solid state drive (SSD)), or a storage device such as a hard disk or a semiconductor storage device built in a computer system. The above program may be transmitted via an electrical communication line or an optical communication line.

Figure 2:
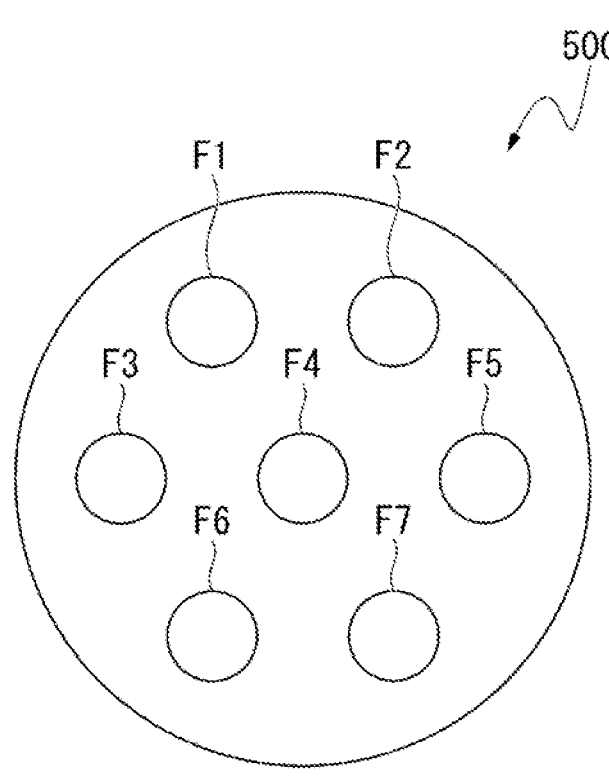
FIG. 2 is a diagram illustrating a configuration example of a multicore fiber.

FIG. 2 is a diagram illustrating a configuration example of a multicore fiber. The multicore fiber 500 illustrated in FIG. 2 includes seven cores F1 to F7 in one clad. Also, the core F4 at the center is defined as a first core group, and the other cores F1 to F3 and F5 to F7 are defined as a second core group in FIG. 2. Note that the core groups are obtained by grouping the cores with equal transmission quality (see Japanese Patent No. 6663384, for example). Although the multicore fiber 500 in the configuration example in FIG. 2 will be described as an example in each of the following embodiments, the number of cores included in the multicore fiber may be 6 or less or 8 or more. Also, the cores of the multicore fiber may not be split into core groups. Additionally, the multicore fiber may be a transmission path optical fiber that can spatially separate signals, such as a multimode fiber, a few-mode fiber, or a multicore-multimode fiber.

Figure 3:
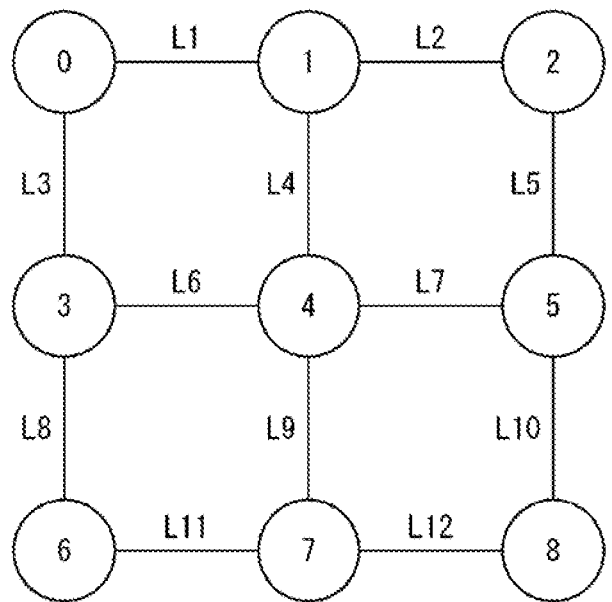
FIG. 3 is a diagram illustrating a configuration example of a network.

FIG. 3 is a diagram illustrating a configuration example of a network. The network illustrated in FIG. 3 has a 3×3 lattice network configuration. In FIG. 3, links L1 to L12 are edges (branches, sides) of the network based on the graph theory. 0 to 8 denotes nodes (vertexes, contacts) of the network based on the graph theory. Although the network in the configuration example in FIG. 3 will be described as an example in each of the following embodiments, the configuration of the network is not limited thereto. Also, such a configuration of the network is created by and stored in, for example, the network operation device 2.

Figure 4:
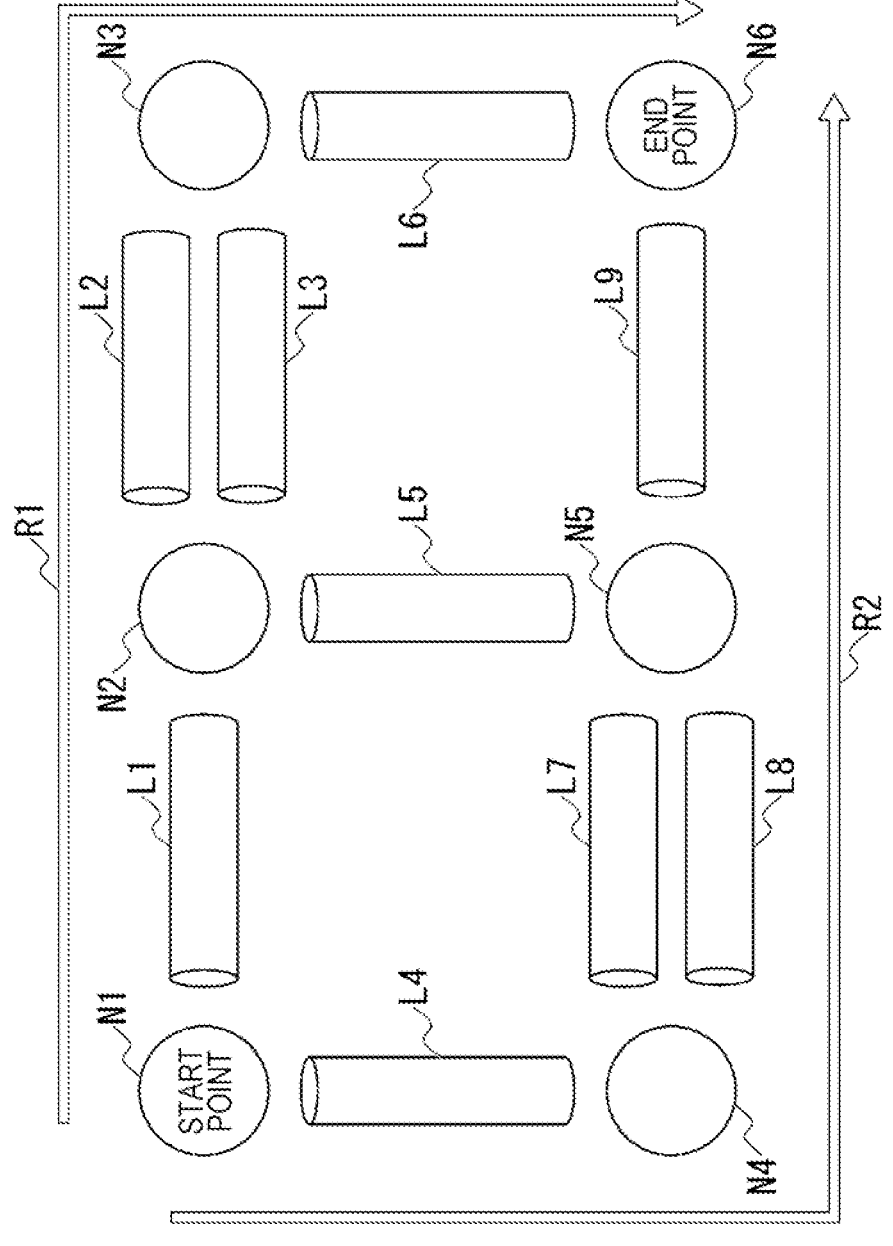
FIG. 4 is a diagram for explaining optical path routes, links, cores, and wavelengths.

Here, optical path routes, links, core, and wavelength in the embodiment will be described using FIG. 4. FIG. 4 is a diagram for explaining an optical path routes, links, cores, and wavelengths. In the example in FIG. 4, the node N1 is a start point of an optical path that accommodates communication demand in the network, and the node N6 is an end point of the communication demand in the network, from among the nodes N1 to N6. The nodes are connected by multicore fibers 5 for establishing connection. Also, a plurality of links L for establishing connection between the nodes may be present between the nodes. For example, there is one link (link L1) between the node N1 and the node N2 and there are two links (links L2 and L3) between the node N2 and the node N3. In each of the embodiment, the link L is a multicore fiber 5. Also, the multicore fiber 5 used as the link L includes a plurality of cores F as illustrated in FIG. 2.

Furthermore, wavelengths are present in the cores. In a wavelength division multiplexing (WDM) system, for example, a plurality of wavelengths are present. Therefore, an optical path route, a link, a core, and a wavelength are selected (determined) to set an optical path in the embodiment.

In FIG. 4, four possibilities (a first possible route to a fourth possible route) are illustrated for the optical path route. The first possible route is a route R1, which is a route of the link L1-the link L2-the link L6. The second possible route is a route R1, which is a route of the link L1-the link L3-the link L6. Note that the route R1 is a route in the order of the nodes N1-N2-N3-N6. The third possible route is a route R2, which is a route of the link L4-the link L7-the link L9. The fourth possible route is a route R1, which is a route of the link L1-the link L8-the link L9. Note that the route R2 is a route in the order of the nodes N1-N4-N5-N6.

Furthermore, the first possible route to the fourth possible route are subdivided depending on cores and wavelengths to be used.

In each method in the embodiment, the same core numbers are used for each of links x-y-z if "there is a core continuity restriction", and empty wavelengths of the cores are defined as possibilities, under the wavelength continuity restriction. In each method in the embodiment, the different core numbers may be used for each of links x-y-z if "there is no core continuity restriction", and empty wavelengths of the cores are defined as possibilities, under the wavelength continuity restriction.

Here, a spatial division multiplexing optical amplification technique will be described (see Reference Literature 1, for example).

The spatial division multiplexing optical amplification technique can be roughly divided into two categories. One is a multi-core erbium-doped fiber amplifier (MC-EDFA) using an MCF-type amplification medium having a plurality of erbium-doped cores in one optical fiber. The other is a few-mode erbium-doped fiber amplifier (FM-EDFA) that utilizes a few-mode fiber (FMF)-type amplification medium with limited higher-order modes excited by a type of multimode fiber.

Reference Literature 1; Hirotaka Ono, "Spatial Division Multiplexing Optical Amplification Basic Technology", NTT Technical Journal, 2017.3, p. 23 to 27

In each of the following embodiments, the present invention is applied to, for example, an MC-EDFA. The MC-EDFA excitation scheme is categorized into core excitation in which excitation light and signal light are multiplexed to be input to cores and each core is individually excited and clad excitation in which all the cores are collectively excited. Note that the core excitation laser has a property of a larger amount of power consumption than that of the clad excitation laser. On the other hand, the MC-EDFA enables power saving through utilization of both the core excitation and the clad excitation (such as hybrid excitation). Therefore, the number of wavelengths arranged for each core is leveled, and the proportion of the clad excitation is raised thereby to enhance the power saving effect in each of the following embodiments. Note that conjunction with optical path accommodation design is essential to maximize the advantage of the power saving effect in terms of network design. Therefore, the number of wavelengths arranged for each core on the MC-EDFA is leveled by optical path accommodation design in each of the following embodiments. More specifically, a variance value (or a standard deviation value) or an average value of the number of wavelengths is used for the metric to level the number of used wavelengths and thus arrange wavelengths in each of the following embodiments in order to achieve wavelength arrangement in consideration of the power saving effect of the MC-EDFA.

First Embodiment

In the present embodiment, a variance value (variation) or a standard deviation of the number of wavelengths used for each core of the multicore fiber 5 (MCF) over the entire NW 4 is used as an index, and cores in the same core group are selected (there is a core continuity restriction (the same cores are used); there is a wavelength continuity restriction), in a spatial multiplexing optical network system. In the present embodiment, the metric calculation target is the entire network (NW), the metric calculation is on the basis of a variance value or a standard deviation, and there is a core continuity restriction. Note that in the following description, an example in which the configuration of the multicore fiber illustrated in FIG. 2, the network configuration illustrated in FIG. 3, and a variance value for metric calculation are used will be described.

FIG. 5 is a flowchart for a processing procedure example according to the present embodiment.

(Step S1) The communication route allocation device 1 calculates a variance value V of each link after setting an optical path n0 using Equation (1) below.

[Math. 1]

$$V = \frac{1}{n} \sum_{i=1}^{n} (x_i - \bar{x})^2 \tag{1}$$

In Equation (1), n is the number of cores, i is a core ID (identification information), xx is the number of wavelengths used for a core Fi, and x is an average value of each link of $x_i$. Note that the value calculated by the communication route allocation device 1 is not limited to the variance value of the number of used wavelengths and may be a standard deviation value of the number of used wavelengths.

(Step S2) The communication route allocation device 1 calculates a metric for setting an optical path n1. Note that the processing performed in step S2 will be described later.

(Step S3) The communication route allocation device 1 calculates a metric for setting an optical path n2. Note that the processing performed in step S3 will be described later.

FIG. 6 is a diagram illustrating the number of used wavelengths and based on core IDs and link IDs and a variance value of each link after setting the optical path no. Note that in the following description, variance values of the numbers of wavelengths used for the links L1 to L12 will be referred to as $V_{L1}$ to $V_{L12}$. Note that the value in each section in FIG. 6 is the number of used wavelengths and indicates, for example, that the number of used wavelengths for the core ID of F1 in the link L1 is 5. Note that the communication route allocation device 1 refers to or acquires the wavelength usage table except for the variance values from the network operation device 2.

Figure 7:
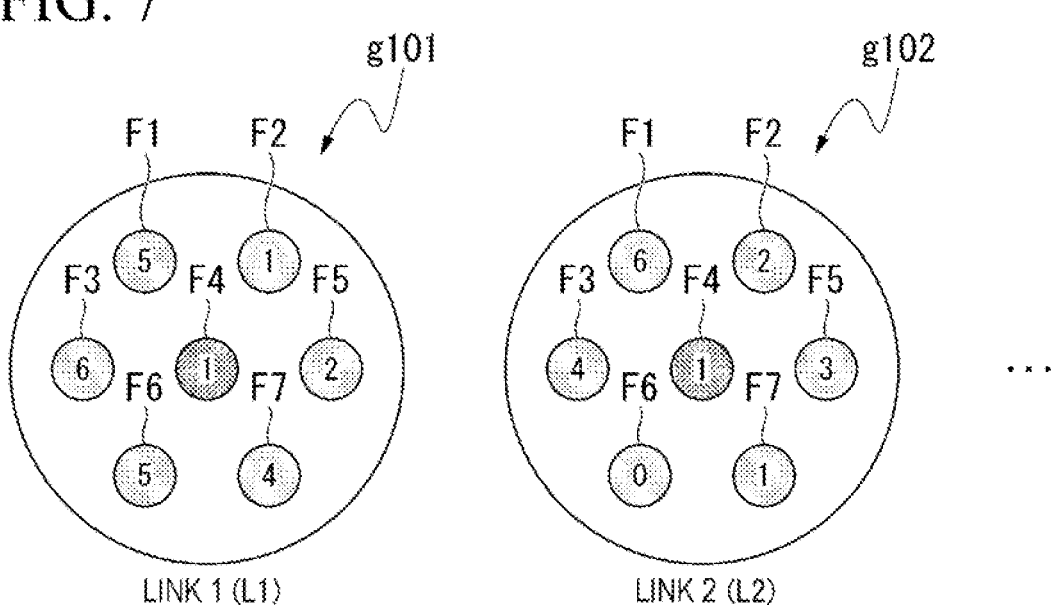
FIG. 7 is a diagram illustrating the number of used wavelengths at each link L.

FIG. 7 is a diagram illustrating an example of the number of wavelengths used for each core at each link L. The numbers of wavelengths used for the cores F1 to F7 for the first link (link L1) g101 are 5, 1, 6, 1, 2, 5, and 4. Also, the numbers of wavelengths used for the cores F1 to F7 for the second link (link L2) g102 are 6, 2, 4, 1, 3, 0, and 1.

Figure 8:
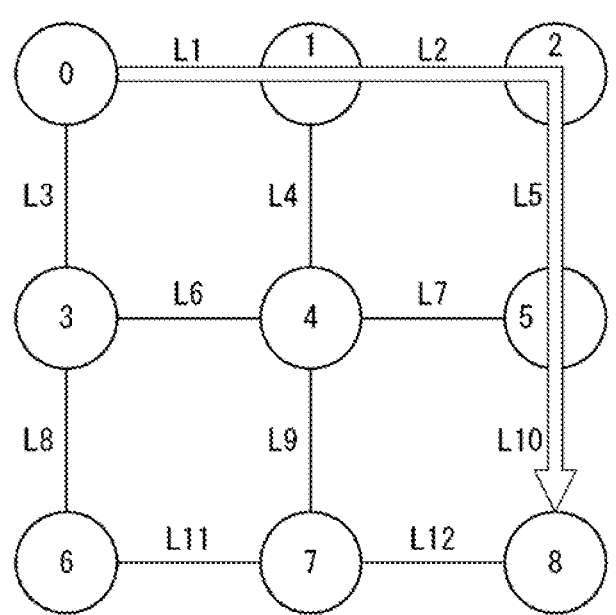
FIG. 8 is a diagram illustrating a possible route example for an optical path n1.

Next, the processing in step S2 for calculating an index (metric) for setting the optical path n1{(A, Z)=(0, 8)} will be described. FIG. 8 is a diagram illustrating a possible route example of the optical path n1. FIG. 9 is a diagram illustrating an example of the processing in step S2 according to the present embodiment. Note that the reason that the section for the core F4 in the table of the metric $V_{nw,j}$ in FIG. 9 is blank is because the core F4 belongs to the first core group and is not used in the second core group.

(Step S21) The route possibility extraction unit 12 obtains the shortest routes by the Dijkstra's algorithm, for example, and calculates and extracts possible routes of the optical path n1 satisfying the wavelength continuity restriction from among the shortest routes. In the following description, a case where the link L1-the link L2-the link L5-the link L10 is calculated as a possible route for the optical path n1 as illustrated in FIG. 8 will be described.

(Step S22) The core selection unit 13 performs setting such that the optical path n1 is to be used for the second core group.

(Step S23) The core selection unit 13 calculates a variance value $V_{Lj}$ and a metric $V_{nw,j}$ $(=1/j \times \Sigma(V_{Lj}))$ (a variance value over the entire NW 4) of each link $(L_j)$ in a case where it is assumed that the optical path n1 has selected the core F1 and has used the wavelength on the possible route. Note that for the metric $V_{nw,j}$, the sum of variance values $(\Sigma(V_{Lj}))$ is calculated for the links over the entire network. Therefore, the metric $V_{nw,j}$ does not change the number of j for any possible routes (as long as there is no change in the total number of links in the network). As a specific example, the sum of the variance values is $\Sigma(V_{Lj})=V_{L1}+V_{L2}+V_{L3}+V_{L4}+V_{L5}+V_{L6}+V_{L7}+V_{L8}+V_{L9}+V_{L10}+V_{L11}+V_{L12}$ (j=1 to 12). The core selection unit 13 calculates the variance value $V_{Lj}$ and the metric $V_{nw,j}$ in a case where it is assumed that the optical path n1 has selected the core F2 and has used the wavelength on the possible route ("metric calculation F2" in FIG. 9). Subsequently, the core selection unit 13 calculates the variance value $V_{Lj}$ and the metric $V_{nw,j}$ in a case where it is assumed that the optical path n1 has selected the core F3 and has used the wavelength on the possible route. Subsequently, the core selection unit 13 calculates the variance value $V_{Lj}$ and the metric $V_{nw,j}$ in a case where it is assumed that the optical path n1 has selected the core F5 and has used the wavelength on the possible route. Subsequently, the core selection unit 13 calculates the variance value $V_{Lj}$ and the metric $V_{nw,j}$ in a case where it is assumed that the optical path n1 has selected the core F6 and has used the wavelength on the possible route. Subsequently, the core selection unit 13 calculates the variance value $V_{Lj}$ and the metric $V_{nw,j}$ in a case where it is assumed that the optical path n1 has selected the core F7 and has used the wavelength on the possible route. Note that the present embodiment is an example that the cores in the same core group are selected as described above and the optical path n1 has calculated the metric $V_{nw,j}$ in the cores F1, F2, F3, F5, F6, and F7 in the same core group. In the following embodiments, the metric is calculated for the cores in the core group selected similarly to the case where the first core group is selected in the first embodiment.

(Step S25) The core selection unit 13 selects the core F having the minimum metric $V_{nw,j}$ as the utilization core of the optical path n1.

(Step S26) The wavelength selection unit 14 selects the wavelengths in the selected cores using a wavelength selection algorithm such as a least fragmentation (LF) method (see Reference Literature 2) or a first fit (FF) method (see Reference Literature 3). Note that the LF method and the FF method are wavelength selection algorithms (wavelength selection methods) in optical path accommodation design. In a case where there are a plurality of wavelengths that are allocatable in an end-to-end manner when wavelengths of optical signals on the communication routes are selected, that is, in a case where there are a plurality of wavelengths that satisfy the wavelength continuity restriction, the LF method is an algorithm in which the amount of correlations between the wavelength utilization condition of each link and wavelength utilization conditions of adjacent links on the communication route is obtained and a wavelength that suppresses occurrence of a section where wavelength utilization conditions are fragmented is used with higher priority for each communication route section, and the FF method is an algorithm in which the wavelengths are allocated in the order from the wavelength with the smallest number applied thereto, from the allocatable wavelengths.

Reference Literature 2: Yoshiaki Sone, et al., "Efficient Routing and Wavelength Assignment. Algorithm Minimizes Wavelength Fragmentations in WDM Mesh Networks", OECC 2011, p 178-p 179, 6A1_4, July 2011

Reference Literature 3: HUI Zang, et al., "A Review of Routing and Wavelength Assignment Approaches for Wavelength-Routed Optical WDM Networks", Optical Network Magazine, Vol. 1, pp. 47-60, January 2000

In the example of FIG. 9, for example, the initial states are (L1, L2, L5, L10)=(5, 6, 7, 2) @F1, (L1, L2, 15, L10)=(1, 2, 1, 2) @F2, . . . . The core selection unit 13 calculates the metric $V_{nw,j}$ assuming that the metric calculation F1 as (L1, L2, L5, L10)=(6, 7, 8, 3) @F1 in step S23. Also, the core selection unit 13 calculates the metric $V_{nw,j}$ assuming that the metric calculation F2 as (L1, L2, L5, L10)=(2, 3, 2, 3) @F2. Note that @ represents "in" or "at". Then, the core selection unit 13 selects the core F2 for which the metric $V_{nw,j}$ is the minimum value 6.071 in step S25.

Figure 10:
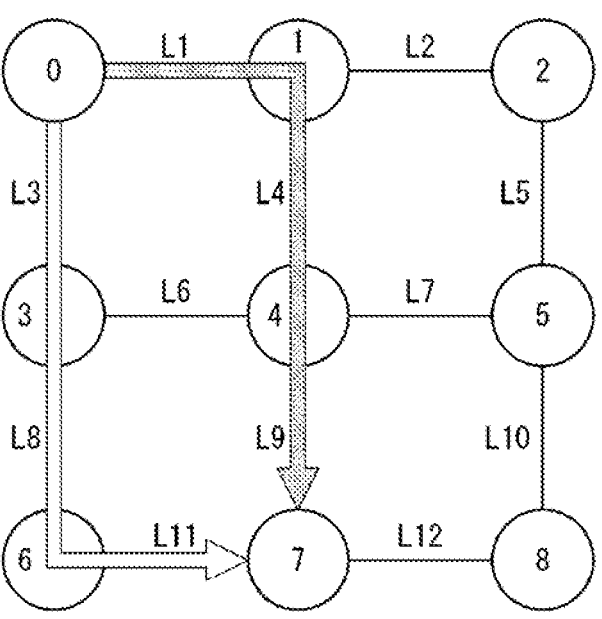
FIG. 10 is a diagram illustrating a possible route example for an optical path n2.

Next, the processing in step 93 for calculating the index (metric) for setting the optical path n2 $\{(A, Z)=(0, 7)\}$ will be described. FIG. 10 is a diagram illustrating a possible route example of the optical path n2. FIG. 11 is a diagram illustrating an example of the processing in step S3 according to the present embodiment. Note that the reason that the section for the core F4 in the table of the metric $V_{nw,j}$ in FIG. 11 is blank is because the core F4 belongs to the first core group and is not used in the second core group.

(Step S31) The route possibility extraction unit 12 calculates and thus extracts the possible routes for the optical path n2 by the Dijkstra's algorithm, for example. In the following description, a case where the first possible route (the link L1-the link L4-the link L9) and the second possible route (the link L3-the link L8-the link L11) have been calculated as possible routes for the optical path n2 as illustrated in FIG. 10 will be described.

(Step S32) The core selection unit 13 performs setting such that the optical path n2 is to be used for the second core group.

(Step S33) The core selection unit 13 calculates, for each possible route, the variance value $V_{Lj}$ and a metric $V_{nw,j}(=1/j \times \Sigma(V_{Lj}))$ of each link $(L_j)$ in a case where it is assumed that the optical path n2 has selected the core F1 and has used the wavelength on the possible route. The core selection unit 13 calculates, for each possible route, the variance value $V_{Lj}$ and the metric $V_{nw,j}$ in a case where it is assumed that the optical path n2 has selected the core F2 and has used the wavelength on the possible route. Subsequently, the core selection unit 13 calculates, for each possible route, the variance value $V_{Lj}$ and the metric $V_{nw,j}$ in a case where it is assumed that the optical path n2 has selected the core F3 and has used the wavelength on the possible route. Subsequently, the core selection unit 13 calculates, for each possible route, the variance value $V_{Lj}$ and the metric $V_{nw,j}$ in a case where it is assumed that the optical path n2 has selected the core F5 and has used the wavelength on the possible route. Subsequently, the core selection unit 13 calculates, for each possible route, the variance value $V_{Lj}$ and the metric $V_{nw,j}$ in a case where it is assumed that the optical path n2 has selected the core F6 and has used the wavelength on the possible route. Subsequently, the core selection unit 13 calculates, for each possible route, the variance value $V_{Lj}$ and the metric $V_{nw,j}$ in a case where it is assumed that the optical path n2 has selected the core F7 and has used the wavelength on the possible route.

(Step S35) The core selection unit 13 selects the possible route with the minimum metric $V_{nw,j}$ and the core F as the route, the link, and the core used by the optical path n2.

(Step S36) The wavelength selection unit 14 selects wavelengths in the selected cores using, for example, the LF method or the FF method.

In the example of FIG. 11, for example, the initial states are (L1, L4, L9)=(5, 6, 4) @F1, (L1, L4, L9)=(1, 2, 8) @F2, . . . . The core selection unit 13 calculates the metric $V_{nm}$ assuming that the metric calculation F1 of the first possible route as (L1, 14, L9)=(6, 7, 5) @F1 in step S33. Also, the core selection unit 13 calculates the metric $V_{nw}$ assuming that the metric calculation F2 of the first possible route as (L1, L4, L9)= . . . in step S34. Moreover, the core selection unit 13 performs the metric calculation F1 for the second possible route in step S33 and performs metric calculation F2 to F7 for the second possible route in step S34. Then, the core selection unit 13 selects the second possible route and the core F1 for which the metric $V_{nw,j}$ is the minimum value 5.983 in step S36.

The core selection unit 13 selects the route links L1-L2-L5-L10 and the core F2 as the optical path n1 and the route links L3-L8-L11 and the core F1 as the optical path n2, for example, through the above processing.

As described above, the number of wavelengths (the number of optical paths) to be accommodated in each core is controlled by extracting and selecting the optical path route and the link, the core, and the wavelength to be used by using the variance value or the standard deviation of the wavelength utilization conditions over the entire NW 4 with the core continuity restriction in the present embodiment. In this manner, according to the present embodiment, it is possible to take a power saving property of the multicore optical amplifier configuring the SDM-NW into consideration and to level the number of set wavelengths for the core used in optical path design at the time of request for optical path connection. As a result, according to the present embodiment, it is possible to level the number of wavelengths used for each core and thereby to obtain the effect of power saving of the multicore optical amplifier over the entire network.

Note that although the example in which the cores are allocated in a split manner into the first core group and the second core group has been described in the above example, the present invention is not limited thereto. The core selection unit 13 may select all the cores as targets in Steps S2 and S3.

Here, a processing example in the case where all the cores are selected as targets will be described.

The route possibility extraction unit 12 calculates and thus extracts possible routes for the optical path n1 by the Dijkstra's algorithm, for example (step S21). The route possibility extraction unit 12 moves on to the processing in step S23 after the processing.

The core selection unit 13 calculates a variance value $V_{Lj}$ and a metric $V_{nw,j}$ $(=1/j×Σ(V_{Lj}))$ (a variance value over the entire NW 4) of each link $(L_j)$ in a case where it is assumed that the optical path n1 has selected the cores F1 to F7 and has used the wavelength on the possible route (step S23).

The core selection unit 13 selects the core F with the minimum metric $V_{nw,j}$ as a core used by the optical path n1 (step S25). The wavelength selection unit 14 selects the wavelength in the selected core using the LF method or the FF method, for example (step S26).

In the example of FIG. 9 in a case where all the cores are defined as targets of selection, the core selection unit 13 calculates the metric $V_{nw,j}$ by assuming the metric calculation F1 as (L1, L2, L5, L10)=(6, 7, 8, 3)@F1, calculates the metric $V_{nw,j}$ by assuming the metric calculation F2 as (L1, L2, L5, L10)=(2, 3, 2, 3)@F2, calculates the metric $V_{nw,j}$ by assuming the metric calculation F3 as (L1, L2, 15, L10)=(7, 5, 3, 4)@F3, calculates the metric $V_{nw,j}$ by assuming the metric calculation F4 as (L1, L2, L5, L10)=(2, 2, 9, 7)@F4, and calculates . . . up to the metric calculation FX in step S23. Then, the core selection unit 13 selects the core with the minimum metric $V_{nw,j}$ in the metric calculation 1 to X in step S25.

In other words, in the case where all the cores are selected as targets, the processing regarding the core groups in step S22 is not performed, and the metric calculation for the core F4 belonging to the first core group is also performed, thereby to set all the cores as targets.

Note that although the example in which the number of core groups for the seven core fibers is two has been illustrated, similar processing is performed for a multicore fiber in which more core groups are present.

Second Embodiment

In the present embodiment, a variance value (variation) of the number of wavelengths used for each core over the entire NW 4 is defined as metric, and cores in the same core group are selected (under a condition with no core continuity restriction and that there is no need to use the same cores and a condition with the wavelength continuity restriction) in a spatial multiplexing optical network system. In the present embodiment, the target of metric calculation is the entire network (NW), the metric calculation is performed on the basis of a variance value or a standard deviation, and there is no core continuity restriction. Note that in the following description, the configuration of the multicore fiber illustrated in FIG. 2 and the network configuration illustrated in FIG. 3 will be described as examples. Note that either the variance value or the standard deviation may be used for the metric calculation in the present embodiment as well. In the following example, a case where the variance value is used will be described as an example.

FIG. 12 is a flowchart for a processing procedure example according to the present embodiment.

(Step S1) The communication route allocation device 1 calculates a variance value V of each link after setting an optical path n0 using Equation (1).

(Step S2A) The communication route allocation device 1 calculates a metric for setting an optical path n1. Note that the processing performed in step S2A will be described later.

(Step S3A) The communication route allocation device 1 calculates a metric for setting an optical path n2. Note that the processing performed in step S3A will be described later.

Next, the processing in step S2A for calculating the index (metric) for setting the optical path n1{(A, Z)=(0, 8)} will be described. FIG. 13 is a diagram illustrating an example of the processing in step S2A according to the present embodiment.

(Step S21) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described. (Step 322) The core selection unit 13 performs setting such that the optical path n1 is to be used for the second core group.

(Step S23A) The core selection unit 13 calculates the variance value $V_{Lj}$ of each link ($L_j$) and the metric $V_{nw,j}$ (the variance value over the entire NW 4) in a case where it is assumed that the optical path n1 has selected a core combination (Fj, Fj, Fj, Fj) of cores and has used the wavelength on the possible route. Note that the combination of cores includes the core (F1, F1, F1, F1), the core (F1, F2, F1, F1), the core (F1, F2, F2, F1), . . . , the core (F7, F7, F7, F7) as illustrated in FIG. 13.

(Step S25) The core selection unit 13 selects the core F having the minimum metric $V_{nw,j}$ as the utilization core of the optical path n1. (Step S26) The wavelength selection unit 14 selects the wavelengths in the selected cores using, for example, the LF method or the FF method.

Next, the processing in step S3A for calculating the index (metric) for setting the optical path n2{(A, 2)=(0, 7)} will be described. FIG. 14 is a diagram illustrating an example of the processing in step S3A according to the present embodiment.

(Step S31) The route possibility extraction unit 12 calculates and thus extracts the possible routes for the optical path n2 by the Dijkstra's algorithm, for example. In the following description, a case where the first possible route (the link L1-the link L4-the link L9) and the second possible route (the link L3-the link L8-the link L11) have been calculated as possible routes for the optical path n2 as illustrated in FIG. 10 will be described. (Step S32) The core selection unit 13 performs setting such that the optical path n2 is to be used for the second core group.

(Step S33A) The core selection unit 13 calculates, for each possible route, the variance value $V_{Lj}$ of each link ($L_j$) and the metric $V_{nw,j}$ (the variance value over the entire NW 4) in a case where it is assumed that the optical path n1 has selected a core combination (Fj, Fj, Fj, Fj) of cores and has used the wavelength on the possible route. Note that the combination of cores includes the core (F1, F1, F1), the core (F1, F2, F1), the core (F1, F2, F2), . . . , the core (F7, F7, F7) as illustrated in FIG. 14.

(Step S35) The core selection unit 13 selects the possible route with the minimum metric $V_{nw,j}$ and the core F as the route and the core used by the optical path n2. (Step S36) The wavelength selection unit 14 selects the wavelengths in the selected cores using, for example, the LF method or the FF method.

Note that the difference between the first embodiment and the second embodiment is that there is a core continuity restriction and cores to be selected for the links configuring the optical path route are selected from the same core number in the first embodiment while there is no core continuity restriction in the second embodiment. Also, since the condition that "there is no need to use the same cores" is adopted in a case where there is no core continuity restriction in the present embodiment, the calculation processing including different core numbers on the possible route in and after "calculate $v_{nw}$ by assuming metric calculation 2; (L1, L2, L5, L10)@(F3, F2, F1, F1)=(6, 3, 8, 3)" in FIG. 13 is different from that in the first embodiment. In the present embodiment, metric calculation is performed for all combinations of all cores that can be taken by each link on the route (L1, L2, L5, L10). On the other hand, metric calculation is performed for combinations of only the same cores of each link on the route in the first embodiment.

As described above, the number of wavelengths (the number of optical paths) to be accommodated in each core is controlled by extracting and selecting the optical path route and the core and the wavelength to be used by using the variance value or the standard deviation of the wavelength utilization conditions over the entire NW 4 with no core continuity restriction in the present embodiment. In this manner, according to the present embodiment, it is possible to level the number of wavelengths used for each core and thereby to obtain the effect of power saving of the multicore optical amplifier over the entire network.

Note that the core selection unit 13 may select all the cores as targets in Steps S2A and S3A in the aforementioned example as well.

Third Embodiment

Although the variance value (or the standard deviation) ($V_{nw,j}$) over the entire NW 4 is used as a metric in the first embodiment and the second embodiment, a variance value (or the standard deviation) ($V_{cr,k}$) on the possible route is used as a metric (the condition that there is a core continuity restriction using the same cores and there is a wavelength continuity restriction) in the present embodiment. In the present embodiment, the metric calculation target is the possible route, the metric calculation is on the basis of a variance value or a standard deviation, and there is a core continuity restriction. Note that in the following description, the configuration of the multicore fiber illustrated in FIG. 2 and the network configuration illustrated in FIG. 3 will be described as examples. Note that either the variance value or the standard deviation may be used for the metric calculation in the present embodiment as well. In the following example, a case where the variance value is used will be described as an example.

Figure 15:
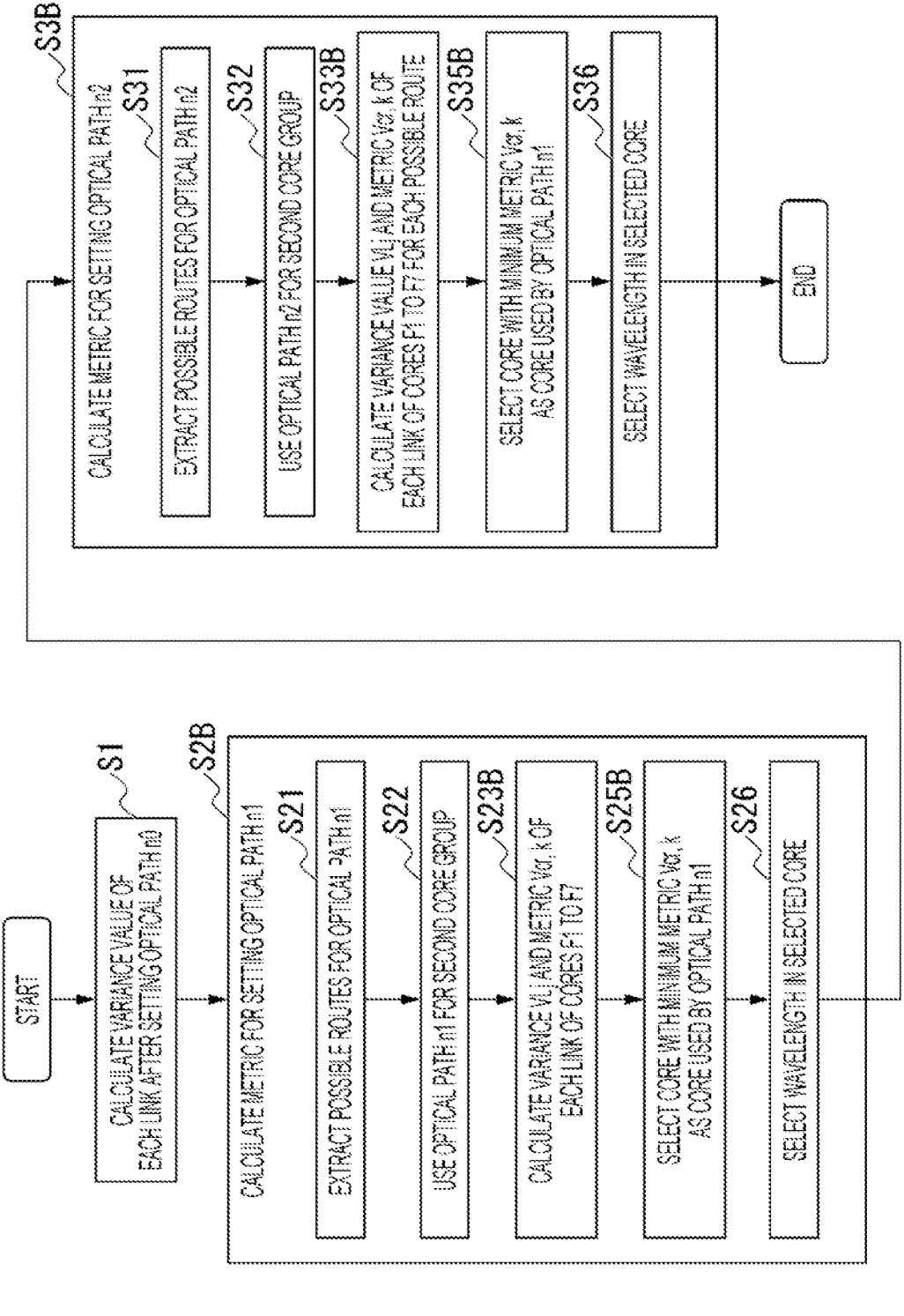
FIG. 15 is a flowchart for a processing procedure example according to the third embodiment.

FIG. 15 is a flowchart for processing procedure example according to the present embodiment.

(Step S1) The communication route allocation device 1 calculates a variance value V of each link after setting an optical path n0 using Equation (1).

(Step S2B) The communication route allocation device 1 calculates a metric for setting an optical path n1. The communication route allocation device 1 calculates the variance value on the possible route for the metric calculation when the optical path n1 is set. Note that the processing performed in step S2B will be described later.

(Step S3B) The communication route allocation device 1 calculates a metric for setting an optical path n2. Note that the processing performed in step S3B will be described later.

Next, the processing in step S2B for calculating the index (metric) for setting the optical path n1{(A, Z)=(0, 8)} will be described. FIG. 16 is a diagram illustrating an example of the processing in step S2B according to the present embodiment. Note that the reason that the section for the core F4 in the table of the metric $V_{cr,k}$ in FIG. 16 is blank is because the core F4 belongs to the first core group and is not used in the second core group.

(Step S21) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described. (Step S22) The core selection unit 13 performs setting such that the optical path n1 is to be used for the second core group.

(Step S23B) The core selection unit 13 calculates the variance value $V_{Lk}$ and a metric $V_{cr,k}(=1/k\times\Sigma(V_{Lk}))$ of each link ($L_k$) on the possible route in a case where it is assumed that the optical path n1 has selected the core F1 and has used the wavelength on the possible route. In this manner, according to the present embodiment, the metric $V_{cr,k}$ is calculated using the variance value on the possible route. Note that as the metric $V_{cr,k}$, a sum ($\Sigma(V_{Lk})$) of variance values of only the links on the possible route is calculated. In addition, the number of k in the metric $V_{cr,k}$ changes for each possible route (in accordance with the number of links of the possible route). In a specific example, the sum of the variance values in the case of FIG. 8 is $\Sigma(V_{Lk})=V_{L1}+V_{L2}+V_{L5}+V_{L10}$ (k=1, 2, 5, 10). The core selection unit 13 calculates the variance value $V_{Lk}$ and the metric $V_{cr,k}$ in a case where it is assumed that the optical path n1 has selected the core F2 and has used the wavelength on the possible route. Subsequently, the core selection unit 13 calculates the variance value $V_{Lk}$ and the metric $V_{cr,k}$ in a case where it is assumed that the optical path n1 has selected the core F3 and has used the wavelength on the possible route. Subsequently, the core selection unit 13 calculates the variance valve $V_{Lk}$ and the metric $V_{cr,k}$ in a case where it is assumed that the optical path n1 has selected the core F5 and has used the wavelength on the possible route. Subsequently, the core selection unit 13 calculates the variance value $V_{Lk}$ and the metric $V_{cr,k}$ in a case where it is assumed that the optical path n1 has selected the core F6 and has used the wavelength on the possible route. Subsequently, the core selection unit 13 calculates the variance value $V_{Lk}$ and the metric $V_{cr,k}$ in a case where it is assumed that the optical path n1 has selected the core F7 and has used the wavelength on the possible route.

(Step S25) The core selection unit 13 selects the core F with the minimum metric $V_{cr,k}$ as the core used by the optical path n1. (Step S26) The wavelength selection unit 14 selects the wavelengths in the selected cores using, for example, the LF method or the FF method.

In the example in FIG. 16, for example, the core selection unit 13 calculates the metric $V_{cr,k}$ by assuming the metric calculation F1 as (L1, L2, L5, L10)=(6, 7, 8, 3)@F1 in step S23B. Also, the core selection unit 13 calculates the metric $V_{cr,k}$ assuming that the metric calculation F2 as (L1, L2, L5, L10)=(2, 3, 2, 3) @F2. The core selection unit 13 selects the core F2 with the minimum metric $V_{cr,k}$ value of 4.653 in step S25.

Next, the processing in step S3B for calculating the index (metric) for setting the optical path n2 {(A, Z)=(0, 7)} will be described. FIG. 17 is a diagram illustrating an example of the processing in step S3B according to the present embodiment. In FIG. 17, the table g201 is a wavelength usage table and the variance value based on the core IDs and the link IDs in a case where the first possible route of the optical path n2 is calculated. The table g202 is a wavelength usage table and the variance value based on the core IDs and the link IDs in a case where the second possible route of the optical path n2 is calculated. Note that the reason that the section for the core F4 in the table of the metric $V_{cr,k}$ in FIG. 17 is blank is because the core F4 belongs to the first core group and is not used in the second core group.

(Step S31) The route possibility extraction unit 12 calculates and thus extracts the possible routes for the optical path n2 by the Dijkstra's algorithm, for example. In the following description, a case where the first possible route (the link L1-the link L4-the link L9) and the second possible route (the link L3-the link L8-the link L11) have been calculated as possible routes for the optical path n2 as illustrated in FIG. 10 will be described. (Step S32) The core selection unit 13 performs setting such that the optical path n2 is to be used for the second core group.

(Step S33B) The core selection unit 13 calculates, for each possible route, the variance value $V_{Lk}$ and a metric $V_{cr,k}$ ($=1/k\times\Sigma(V_{Lk})$) of each link ($L_k$) on the possible route in a case where it is assumed that the optical path n2 has selected the core F1 and has used the wavelength on the possible route. In a specific example, the sum of the variance values of the first possible route in FIG. 10 is $\Sigma(V_{Lk})=V_{L1}+V_{L4}+V_{L9}$ (k=1, 4, 9), and the sum of the variance values of the second possible route is $\Sigma(V_{Lk})=V_{L3}+V_{L8}+V_{L11}$ (k=3, 8, 11). The core selection unit 13 calculates, for each possible route, the variance value $V_{Lk}$ and the metric $V_{cr,x}$ in a case where it is assumed that the optical path n2 has selected the core F2 and has used the wavelength on the possible route. Subsequently, the core selection unit 13 calculates, for each possible route, the variance valve $V_{Lk}$ and the metric $V_{cr,k}$ in a case where it is assumed that the optical path n2 has selected the core F3 and has used the wavelength on the possible route. Subsequently, the core selection unit 13 calculates, for each possible route, the variance value $V_{Lk}$ and the metric $V_{cr,k}$ in a case where it is assumed that the path n2 has selected the core F5 and has used the wavelength on the possible route. Subsequently, the core selection unit 13 calculates, for each possible route, the variance value $V_{Lk}$ and the metric $V_{cr,k}$ in a case where it is assumed that the optical path n2 has selected the core F6 and has used the wavelength on the possible route. Subsequently, the core selection unit 13 calculates, for each possible route, the variance value $V_{Lk}$ and the metric $V_{cr,k}$ in a case where it is assumed that the optical path n2 has selected the core F7 and has used the wavelength on the possible route.

(Step S35B) The core selection unit 13 selects the possible route with the minimum metric $V_{cr,k}$ and the core F as the optical path route, the link, and the core used by the optical path n2. (Step S36) The wavelength selection unit 14 selects the wavelengths in the selected cores using, for example, the LF method or the FF method.

Then, the core selection unit 13 selects the second possible route and the core F1 for which the metric $V_{cr,k}$ of the optical path n2 is the minimum value 5.850 in step S36 in the example in FIG. 17.

As described above, the number of wavelengths (the number of optical paths) to be accommodated in each core is controlled by extracting and selecting the optical path route and the core and the wavelength to be used by using the variance value or the standard deviation of the wavelength utilization conditions on the possible route with the core continuity restriction in the present embodiment. In this manner, according to the present embodiment, it is possible to level the number of wavelengths used for each core and thereby to obtain the effect of power saving of the multicore optical amplifier over the entire network.

Note that the core selection unit 13 may select all the cores as targets in Steps S2B and S38 in the aforementioned example as well.

Fourth Embodiment

In the present embodiment, the variance value or the standard deviation of the wavelength utilization conditions on the possible route is used (the condition that there is no core continuity restriction and there is a wavelength continuity restriction). In the present embodiment, the metric calculation target is the possible route, the metric calculation is on the basis of a variance value or a standard deviation, and there is no core continuity restriction. Note that in the following description, the configuration of the multicore fiber illustrated in FIG. 2 and the network configuration illustrated in FIG. 3 will be described as examples. Note that either the variance value or the standard deviation may be used for the metric calculation in the present embodiment as well. In the following example, a case where the variance value is used will be described as an example.

FIG. 18 is a flowchart for a processing procedure example according to the present embodiment.

(Step S1) The communication route allocation device 1 calculates a variance value V of each link after setting an optical path n0 using Equation (1).

(Step S2C) The communication route allocation device 1 calculates a metric for setting an optical path n1. The communication route allocation device 1 calculates the variance value on the possible route for the metric calculation when the optical path n1 is set. Note that the processing performed in step S2C will be described later.

(Step S3C) The communication route allocation device 1 calculates a metric for setting an optical path n2. Note that the processing performed in step S3C will be described later.

Next, the processing in step S2C for calculating the index (metric) for setting the optical path n1 {(A, Z)=(0, 8)} will be described. FIG. 19 is a diagram illustrating an example of the processing in step S2C according to the present embodiment. Note that the reason that the section for the core F4 in the table of the metric in FIG. 19 is blank is because the core F4 belongs to the first core group and is not used in the second core group.

(Step S21) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described. (Step S22) The core selection unit 13 performs setting such that the optical path n1 is to be used for the second core group.

(Step S23C) The core selection unit 13 calculates the variance value $V_{Lk}$ of each link ($L_k$) on the possible route in a case where it is assumed that the optical path n1 has selected the core F1 and has used the wavelength on the possible route. The core selection unit 13 calculates the variance value $V_{Lk}$ of each link ($L_k$) on the possible route in a case where it is assumed that the optical path n1 has selected the core F2 and has used the wavelength on the possible route. Subsequently, the core selection unit 13 calculates the variance value $V_{Lk}$ of each link ($L_k$) on the possible route in a case where it is assumed that the optical path n1 has selected the core F3 and has used the wavelength on the possible route. Subsequently, the core selection unit 13 calculates the variance value $V_{Lk}$ of each link ($L_k$) on the possible route in a case where it is assumed that the optical path n1 has selected the core F4 and has used the wavelength on the possible route. Subsequently, the core selection unit 13 calculates the variance value $V_{Lk}$ of each link ($L_k$) on the possible route in a case where it is assumed that the optical path n1 has selected the core F5 and has used the wavelength on the possible route. Subsequently, the core selection unit 13 calculates the variance valve $V_{Lk}$ of each link ($L_k$) on the possible route in a case where it is assumed that the optical path n1 has selected the core F6 and has used the wavelength on the possible route. Subsequently, the core selection unit 13 calculates the variance value $V_{Lk}$ of each link ($L_k$) on the possible route in a case where it is assumed that the optical path n1 has selected the core F7 and has used the wavelength on the possible route.

(Step S24C) The core selection unit 13 calculates the minimum value of the variance values $V_{L1,f}$ for each link L on the possible route of the cores F1 to F7. For example, the core selection unit 13 calculates the minimum value of the variance values $V_{L1,f}$ of the link L1 on the possible route of the cores F1 to F7. Subsequently, the core selection unit 13 calculates the minimum value of the variance values $V_{L1,f}$ of the link L2 on the possible route of the cores F1 to F7. Subsequently, the core selection unit 13 calculates the minimum value of the variance values $V_{L1,f}$ of the link L5 on the possible route of the cores F1 to F7. Subsequently, the core selection unit 13 calculates the minimum value of the variance values $V_{L1,f}$ of the link 110 on the possible route of the cores F1 to F7.

(Step S25C) The core selection unit 13 calculates the average value $V_{cl,q}$ $(=1/q \times \Sigma(V_{L1,f}; min))$ of the minimum values of the variance values of each link on the possible route as a metric. In a case where the possible route is the link L1-link L2-link L5-link L10, q is 4.

(Step S26C) The core selection unit 13 selects the core F with the minimum metric $V_{cl,q}$ as the core used by the optical path n1. (Step S27C) The wavelength selection unit 14 selects the wavelengths in the selected cores using, for example, the LF method or the FF method.

Note that the initial state of the metric calculation is (F1, F2, . . . , F7)@L1=(5, 1, . . . , 4), @L2= . . . as illustrated in FIG. 19. In the first metric calculation, the variance value is calculated by assuming (F1, F2, . . . , F7)@L1= (6, 1, . . . , 4). In the second metric calculation, the variance value is calculated by assuming (F1, F2, . . . , F7)@L1=(5, 2, . . . , 4). Hereinafter, in the x-th metric calculation, the variance value is calculated by assuming (F1, F2, . . . , F7)@L1=(5, 1, . . . , 5). Then, the core selection unit 13 selects a core of the minimum variance value in the first to x-th metric calculation. On the aforementioned possible route (L1, L2, L5, L10), the metric $V_{cl,q}$=4.439, and the selected route is (F2, F6, F2, F5) which are minimum values of (L1, L2, L5, L10), respectively, as in FIG. 19.

Next, the processing in step S3C for calculating the index (metric) for setting the optical path n2 {(A, Z)=(0, 7)} will be described. FIG. 20 is a diagram illustrating an example of the processing in step S3C according to the present embodiment. Note that the reason that the section for the core F4 in the table of the metric in FIG. 20 is blank is because the core F4 belongs to the first core group and is not used in the second core group.

(Step S31) The route possibility extraction unit 12 calculates and thus extracts the possible routes for the optical path n2 by the Dijkstra's algorithm, for example. In the following description, a case where the first possible route (the link L1-the link L4-the link L9) and the second possible route (the link L3-the link L8-the link L11) have been calculated as possible routes for the optical path n2 as illustrated in FIG. 10 will be described. (Step S32) The core selection unit 13 performs setting such that the optical path n2 is to be used for the second core group.

(Step S33C) The core selection unit 13 calculates, for each possible route, the variance value $V_{Lk}$ of each link ($L_k$) on the possible route in a case where it is assumed that the optical path n2 has selected the core F1 and has used the wavelength on the possible route. The core selection unit 13 calculates, for each possible route, the variance value $V_{Lk}$ of each link ($L_k$) on the possible route in a case where it is assumed that the optical path n2 has selected the core F2 and has used the wavelength on the possible route. Subsequently, the core selection unit 13 calculates, for each possible route, the variance value $V_{Lk}$ of each link ($L_k$) on the possible route in a case where it is assumed that the optical path n2 has selected the core F3 and has used the wavelength on the possible route. Subsequently, the core selection unit 13 calculates, for each possible route, the variance value $V_{Lk}$ of each link ($L_k$) on the possible route in a case where it is assumed that the optical path n2 has selected the core F4 and has used the wavelength on the possible route. Subsequently, the core selection unit 13 calculates, for each possible route, the variance value $V_{Lk}$ of each link ($L_k$) on the possible route in a case where it is assumed that the optical path n2 has selected the core F5 and has used the wavelength on the possible route. Subsequently, the core selection unit 13 calculates, for each possible route, the variance value $V_{Lk}$ of each link ($L_k$) on the possible route in a case where it is assumed that the optical path n2 has selected the core F6 and has used the wavelength on the possible route. Subsequently, the core selection unit 13 calculates, for each possible route, the variance value $V_{Lk}$ of each link ($L_k$) on the possible route in a case where it is assumed that the optical path n2 has selected the core F7 and has used the wavelength on the possible route.

(Step S34C) The core selection unit 13 calculates, for each possible route, the minimum value of the variance values $V_{L1,f}$ for each link L of the cores F1 to F7. For example, the core selection unit 13 calculates, for each possible route, the minimum value of the variance values $V_{L1,f}$ of the link L1 on the possible route of the cores F1 to F7 on the first possible route of the optical path n2. Subsequently, the core selection unit 13 calculates, for each possible route, the minimum value of the variance values $V_{L1,f}$ of the link L4 on the possible route of the cores F1 to F7. Subsequently, the core selection unit 13 calculates, for each possible route, the minimum value of the variance values $V_{L1,f}$ of the link L9 on the possible route of the cores F1 to F7. Similarly, the core selection unit 13 calculates, for each possible route, the minimum value of the variance values $V_{L1,f}$ of the link L3 on the possible route of the cores F1 to F7 on the second possible route of the optical path n2. Subsequently, the core selection unit 13 calculates, for each possible route, the minimum value of the variance values $V_{L1,f}$ of the link L8 on the possible route of the cores F1 to F7. Subsequently, the core selection unit 13 calculates, for each possible route, the minimum value of the variance values $V_{L1,f}$ of the link L11 on the possible route of the cores F1 to F7.

(Step S35C) The core selection unit 13 calculates the metric $V_{cl,q}$ for each possible route. (Step S36C) The core selection unit 13 selects the possible route with the minimum metric $V_{cl,q}$ and the core F from among the metrics $V_{cl,q}$ for all the possible routes as the route and the core used by the optical path n2. (Step S37C) The wavelength selection unit 14 selects the wavelengths in the selected cores using, for example, the LF method or the FF method.

As illustrated in FIG. 20, for example, the calculation result of the variance value of the first possible route of the optical path n2 is as illustrated in Table g251, and the calculation result of the variance value of the second possible route of the optical path n2 is as illustrated in Table g252. In addition, the metric $V_{cl,q}$ of the first possible route of the optical path n2 is 5.537, and the metric $V_{cl,q}$ of the second possible route of the optical path n2 is 5.850.

Therefore, the minimum value of the metric is 5.537 of the first possible route. In addition, the route to be selected is (L1, L4, 19)=(F2, F2, F3). Note that, in a case where the variance values are the same value as in Table g251, the core selection unit 13 may select either core, and for example, may select the core having a smaller core ID number (for example, F2 out of F2 and F5).

As described above, the number of wavelengths (the number of optical paths) to be accommodated in each core is controlled by extracting and selecting the optical path route and the core and the wavelength to be used by using the variance value or the standard deviation of the wavelength utilization conditions on the possible route with no core continuity restriction in the present embodiment. In this manner, according to the present embodiment, it is possible to level the number of wavelengths used for each core and thereby to obtain the effect of power saving of the multicore optical amplifier over the entire network.

Note that the core selection unit 13 may select all the cores as targets in Steps S2C and S3C in the aforementioned example as well.

Fifth Embodiment

In the present embodiment, an example in which the average value of the number of wavelengths used for each core in the link direction over the entire NW 4 is defined as a metric and the cores in the same core group are selected (the condition that there is a core continuity restriction using the same cores and there is a wavelength continuity restriction) will be described. In the present embodiment, the metric calculation target is the entire network (NW), the metric calculation is on the basis of the average value, and there is a core continuity restriction. Note that in the following description, the configuration of the multicore fiber illustrated in FIG. 2 and the network configuration illustrated in FIG. 3 will be described as examples.

Figure 21:
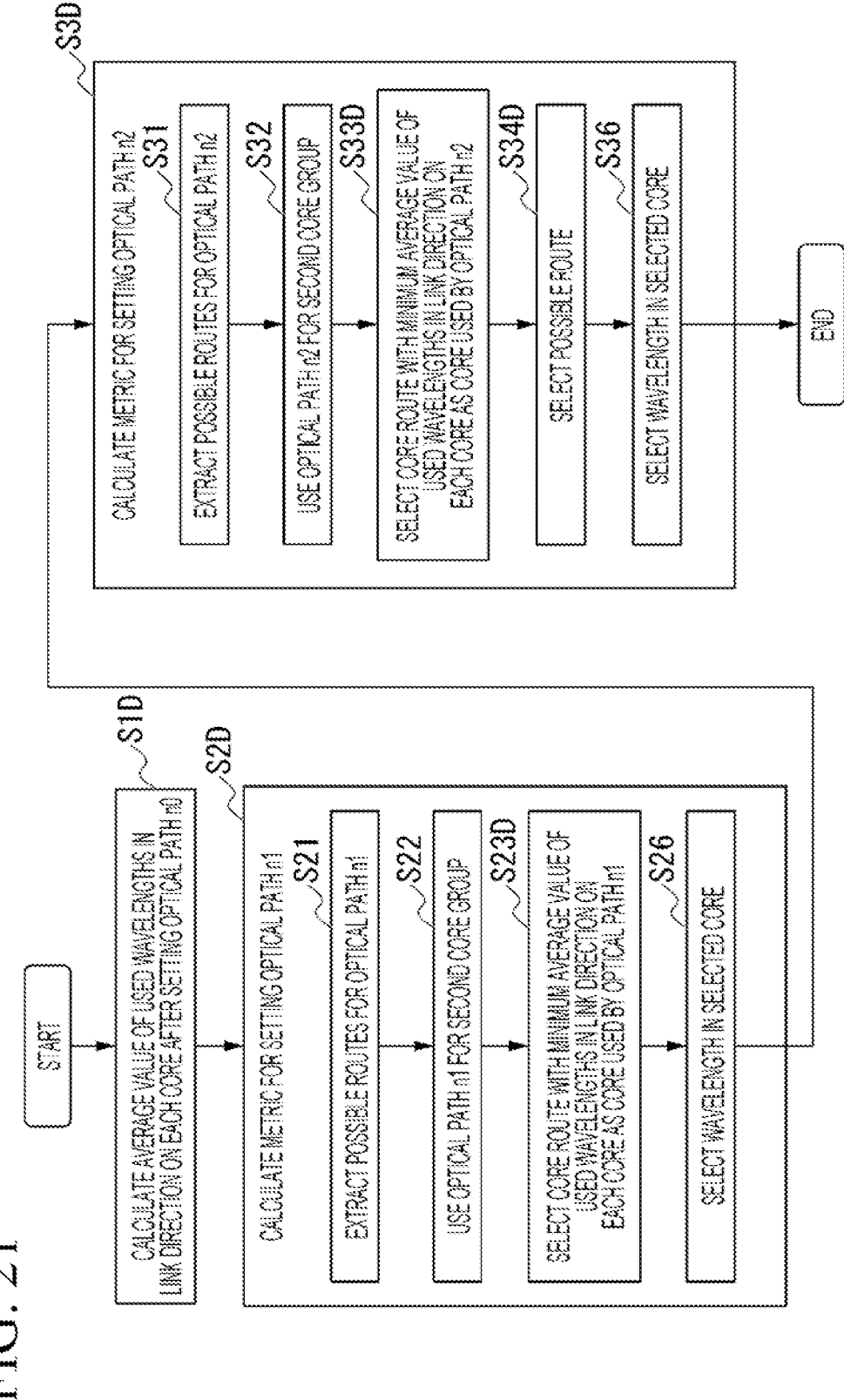
FIG. 21 is a flowchart for a processing procedure example according to a fifth embodiment.

FIG. 21 is a flowchart for a processing procedure example according to the present embodiment.

(Step S1D) The communication route allocation device 1 calculates an average value of wavelengths used in the link direction on each core after setting an optical path n0. FIG. 22 is a diagram illustrating an example of the average value of used wavelengths in the link direction on each core after setting an optical path n0 according to the present embodiment.

(Step S2D) The communication route allocation device 1 calculates a metric for setting an optical path n1. Note that the processing performed in step S2D will be described later.

(Step S3D) The communication route allocation device 1 calculates a metric for setting an optical path n2. Note that the processing performed in step S3D will be described later.

Next, the processing in step S2D for calculating the index (metric) for setting the optical path n1{(A, Z)=(0, 8)} will be described.

(Step S21) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described. (Step S22) The core selection unit 13 performs setting such that the optical path n1 is to be used for the second core group.

(Step S23D) The core selection unit 13 selects a core route in which the average value of the used wavelengths in the link direction on each core after setting the optical path n0 is minimized as the cores used by the optical path n1.

(Step S26) The wavelength selection unit 14 selects the wavelengths in the selected cores using, for example, the LF method or the FF method.

For example, the core selection unit 13 selects the core F2 with the minimum average value of used wavelengths of 3.00 in step S23D in the example in FIG. 22.

Next, the processing in step S3D for calculating the index (metric) for setting the optical path n2{(A, Z)=(0, 7)} will be described. FIG. 23 is a diagram illustrating an example of the processing in step S30 according to the present embodiment.

(Step S31) The route possibility extraction unit 12 calculates and thus extracts the possible routes for the optical path n2 by the Dijkstra's algorithm, for example. In the following example, a case where the first possible route (the link L1-the link L4-the link L9) and the second possible route (the link L3-the link L8-the link L11) have been calculated as possible routes for the optical path n2 as illustrated in FIG. 10 will be described. (Step S32) The core selection unit 13 performs setting such that the optical path n2 is to be used for the second core group.

(Step S33D) The core selection unit 13 selects a core route in which the average value of the used wavelengths in the link direction on each core after setting the optical path n1 is minimized as the cores used by the optical path n2.

(Step S34D) The core selection unit 13 selects a route with a large minimum value of the number of empty wavelengths of each link on the possible route from among the plurality of possible routes. Note that in the example of FIG. 22 or the like, the maximum value of the number of wavelengths of each link is set to 10. Here, the number of empty wavelengths is (the maximum value of the number of wavelengths)–(the number of used wavelengths). In a case where the minimum values of the numbers of empty wavelengths are the same, the core selection unit 13 selects the route of a larger total empty wavelength as the optical path route.

(Step S36) The wavelength selection unit 14 selects the wavelengths in the selected cores using, for example, the LF method or the FF method.

Here, a method of selecting one route from a plurality of possible routes will be described with reference to FIG. 23.

In FIG. 23, the table g301 is an example of a table showing a wavelength setting condition after setting the optical path n1. In a case where the table g301 is obtained, the core selection unit 13 selects the core F2 with the minimum average value first.

Next, the core selection unit 13 obtains the number of empty wavelengths of the core F2 and the minimum value of the numbers of empty wavelengths for the plurality of possible routes. The number of empty wavelengths of the first possible route (L1, L4, L9) is (8 (=10-2), 8 (=10-2), 2 (=10-8)), and the minimum value of the numbers of empty wavelengths is two. The number of empty wavelengths of the second possible route (L3, 18, L11) is (4 (=10-6), 4 (=10-6), 9 (=10-1)), and the minimum value of the numbers of empty wavelengths is four.

Next, the core selection unit 13 selects the second possible route with a large minimum value of the numbers of empty wavelengths of each link on the possible route out of the two possible routes.

Here the reason that the route with a large minimum value of the number of empty wavelengths is selected in the present embodiment will be described. This is because it is desired to prevent a state where the wavelength and the possible route satisfying the wavelength continuity restriction are not present from occurring (occurrence of wavelength blocking) as much as possible as an optical path in response to a communication request when optical paths are sequentially set. The occurrence of the wavelength blocking leads to a situation where it is not possible to set the communication path requested by a user, which is a situation to be avoided for a communication carrier which runs the optical network. In a case where selection is made from routes with small numbers of empty wavelengths (routes with small minimum values of empty wavelengths), the numbers of wavelengths that can be used for the routes decrease, and occurrence probabilities of the wavelength blocking at the routes increase. Therefore, selection is made from routes, the numbers of empty wavelengths in which are large, (the routes with the large minimum values of empty wavelengths) as much as possible in the present embodiment.

As described above, the number of wavelengths (the number of optical paths) to be accommodated in each core is controlled by extracting and selecting the optical path route and the core and the wavelength to be used by using the average value in the link direction over the entire NW 4 with the core continuity restriction in the present embodiment. In this manner, according to the present embodiment, it is possible to level the number of wavelengths used for each core and thereby to obtain the effect of power saving of the multicore optical amplifier over the entire network.

Note that the core selection unit 13 may select all the cores as targets in Steps S2D and S3D in the aforementioned example as well.

Sixth Embodiment

In the present embodiment, an example in which the average value of the number of wavelengths used for each core in the link direction on the possible route is defined as a metric and the cores in the same core group are selected (the condition that there is a core continuity restriction (using the same cores) and there is a wavelength continuity restriction) will be described. In the present embodiment, the metric calculation target is the possible route, the metric calculation is on the basis of the average value, and there is a core continuity restriction. Note that in the following description, the configuration of the multicore fiber illustrated in FIG. 2 and the network configuration illustrated in FIG. 3 will be described as examples.

FIG. 24 is a flowchart for a processing procedure example according to the present embodiment.

(Step S1D) The communication route allocation device 1 calculates an average value of wavelengths used in the link direction on each core after setting an optical path no. FIG. 25 is a diagram illustrating an example of the average value of used wavelengths in the link direction on each core after setting an optical path n0 according to the present embodiment.

(Step S2B) The communication route allocation device 1 calculates a metric for setting an optical path n1. Note that the processing performed in step S2E will be described later.

(Step S3B) The communication route allocation device 1 calculates a metric for setting an optical path n2. Note that the processing performed in step S3E will be described later.

Next, the processing in step S2E for calculating the index (metric) for setting the optical path n1|((A, Z)={0, 8)} will be described.

(Step S21) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described. (Step S22) The core selection unit 13 performs setting such that the optical path n1 is to be used for the second core group.

(Step S23E) The core selection unit 13 selects a core route in which the average value of the numbers of used wavelengths in the link direction on the possible route after setting the optical path n0 is minimized as the cores used by the optical path n1.

(Step S26) The wavelength selection unit 14 selects the wavelengths in the selected cores using, for example, the LF method or the FF method.

In Example in FIG. 25, for example, the core selection unit 13 selects the core F2 with the minimum average value of 1.50 of the numbers of wavelengths used by the link L1-the link L2-the link L5-the link L10 on the possible route in step S23E.

Next, the processing in step S3E for calculating the index (metric) for setting the optical path n2 {(A, Z)=(0, 7)} will be described. FIG. 26 is a diagram illustrating an example of the processing in step S3E according to the present embodiment.

(Step S31) The route possibility extraction unit 12 calculates and thus extracts the possible routes for the optical path n2 by the Dijkstra's algorithm, for example.

In the following description, a case where the first possible route (the link L1-the link L4-the link L9) and the second possible route (the link L3-the link L8-the link L11) have been calculated as possible routes for the optical path n2 as illustrated in FIG. 10 will be described. (Step S32) The core selection unit 13 performs setting such that the optical path n2 is to be used for the second core group.

(Step S33E) The core selection unit 13 selects a core route in which the average value of the used wavelengths in the link direction of each core on the possible route after setting the optical path n1 is minimized as the cores and the possible route used by the optical path n2.

(Step S36) The wavelength selection unit 14 selects the wavelengths in the selected cores using, for example, the LF method or the FF method.

Here, a method of selecting one route from a plurality of possible routes will be described with reference to FIG. 26.

In FIG. 26, the table g351 is an example of a table showing a wavelength setting condition of the first possible route after setting the optical path n1. The table g352 is an example of a table showing a wavelength setting condition of the second possible route after setting the optical path n1.

Next, the core selection unit 13 selects the core F1 and the second possible route with the smallest minimum value of the average values of the numbers of used wavelengths of each link on the possible route out of the two possible routes. Note that when the minimum values of the average values are the same, the core selection unit 13 selects the route with a large minimum value of the empty wavelengths on each possible route.

As described above, the number of wavelengths (the number of optical paths) to be accommodated in each core is controlled by extracting and selecting the optical path route and the core to be used by using the average value in the link direction on the possible route with the core continuity restriction in the present embodiment. In this manner, according to the present embodiment, it is possible to level the number of wavelengths used for each core and thereby to obtain the effect of power saving of the multicore optical amplifier over the entire network.

Note that the core selection unit 13 may select all the cores as targets in Steps SZE and S3E in the aforementioned example as well.

Seventh Embodiment

In the present embodiment, an example in which cores in the same core groups are randomly selected (there is or is not core continuity restriction and there is a wavelength continuity restriction) will be described. In the present embodiment, the metric is randomly calculated, and there may or may not be the core continuity restriction. Note that in the following description, the network configuration illustrated in FIG. 3 will be described as an example.

Figure 27:
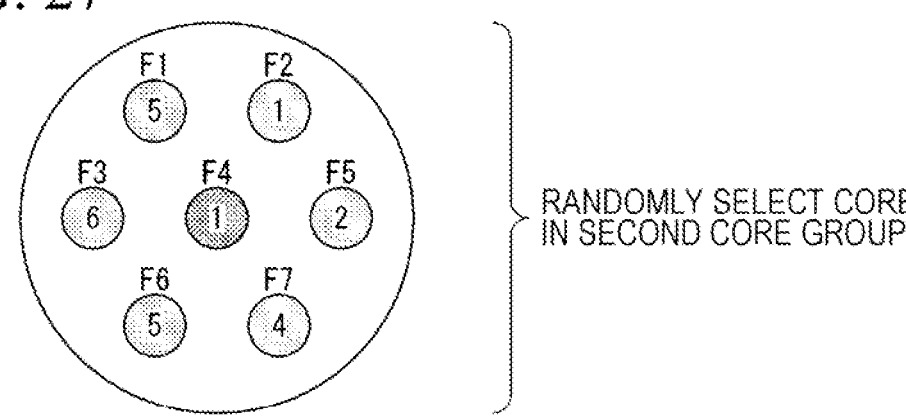
FIG. 27 is a diagram for explaining a processing method according to a seventh embodiment.

FIG. 27 is a diagram for explaining a processing method according to the present embodiment. In the example illustrated in FIG. 27, the core in the first core group is the core F4, and the cores in the second core group are F1, F2, F3, F5, F6, and F7. Also, the number of wavelengths used by the core F1, the core F2, the core F3, the core F4, the core F6, and the core F7 are five, one, six, one, five, and four, respectively.

Figure 28:
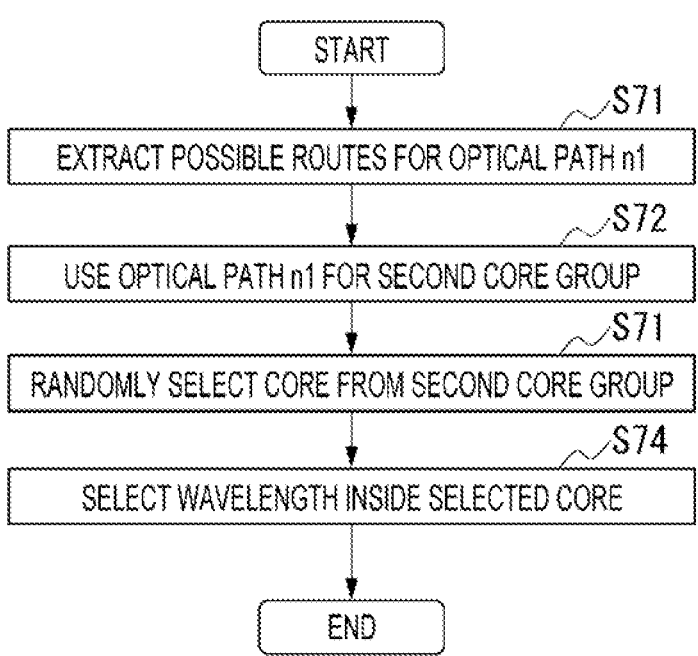
FIG. 28 is a flowchart for a processing procedure example according to the seventh embodiment.

FIG. 28 is a flowchart for a processing procedure example according to the present embodiment.

(Step S71) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described.

(Step S72) The core selection unit 13 performs setting such that the optical path n1 is to be used for the second core group.

(Step S73) The core selection unit 13 randomly selects cores from the second core group.

(Step S74) The wavelength selection unit 14 selects the wavelengths in the selected cores using, for example, the LF method or the FF method.

Here, a processing example in a case where there is a core continuity restriction will be described.

The communication route allocation device 1 stores information regarding a combination of a route, a link, and a core (referred to as a combination A, for example) previously used from among combinations of routes, links, and cores satisfying the wavelength continuity and the core continuity restriction. Next, the communication route allocation device 1 randomly selects a possibility from among possible combinations of routes, links, and cores other than the combination A at the time of the next optical path setting.

Here, a processing example in a case where there is no core continuity restriction will be described.

The communication route allocation device 1 stores information regarding a combination of a route, a link, and a core (referred to as a combination A, for example) previously used from among combinations of routes, links, and cores satisfying wavelength continuity. Next, the communication route allocation device 1 randomly selects a possibility from among possible combinations of routes, links, and cores other than the combination A at the time of the next optical path setting.

As described above, the number of wavelengths (the number of optical paths) to be accommodated in each core is controlled by randomly selecting cores in the same core group in the present embodiment. In this manner, according to the present embodiment, it is possible to level the number of wavelengths used for each core and thereby to obtain the effect of power saving of the multicore optical amplifier over the entire network.

Here, the reason that the number of wavelengths used by each core can be leveled by randomly selecting cores in the same core group will be described.

There is always an upper limit to the number of wavelengths that can be set for each link/core. Therefore, according to the present embodiment, wavelength setting is not biased on a specific core by performing random selection, and the numbers of wavelengths used by each core are thus dispersed and leveled at last in a stage where the number of set wavelengths have increased.

Note that the core selection unit 13 may select all the cores as targets in step S72 in the aforementioned example as well.

Eighth Embodiment

In the present embodiment, an example in which cores in the same core groups are selected in round robin (there is or is not a core continuity restriction and there is a wavelength continuity restriction) will be described. In the present embodiment, the metric calculation is on the basis of round-robin, and there may or may not be the core continuity restriction. Note that in the following description, the network configuration illustrated in FIG. 3 will be described as an example.

Figure 29:
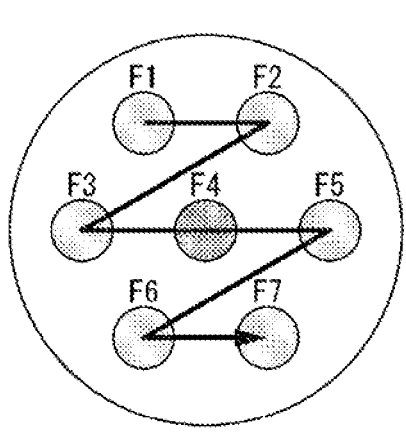
FIG. 29 is a diagram for explaining a processing method according to an eighth embodiment.

FIG. 29 is a diagram for explaining a processing method according to the present embodiment. As illustrated in FIG. 29, cores in the same core group are selected in round robin (next core IDs are selected) without depending on the number of wavelengths used by each core and each link in the present embodiment.

Figure 30:
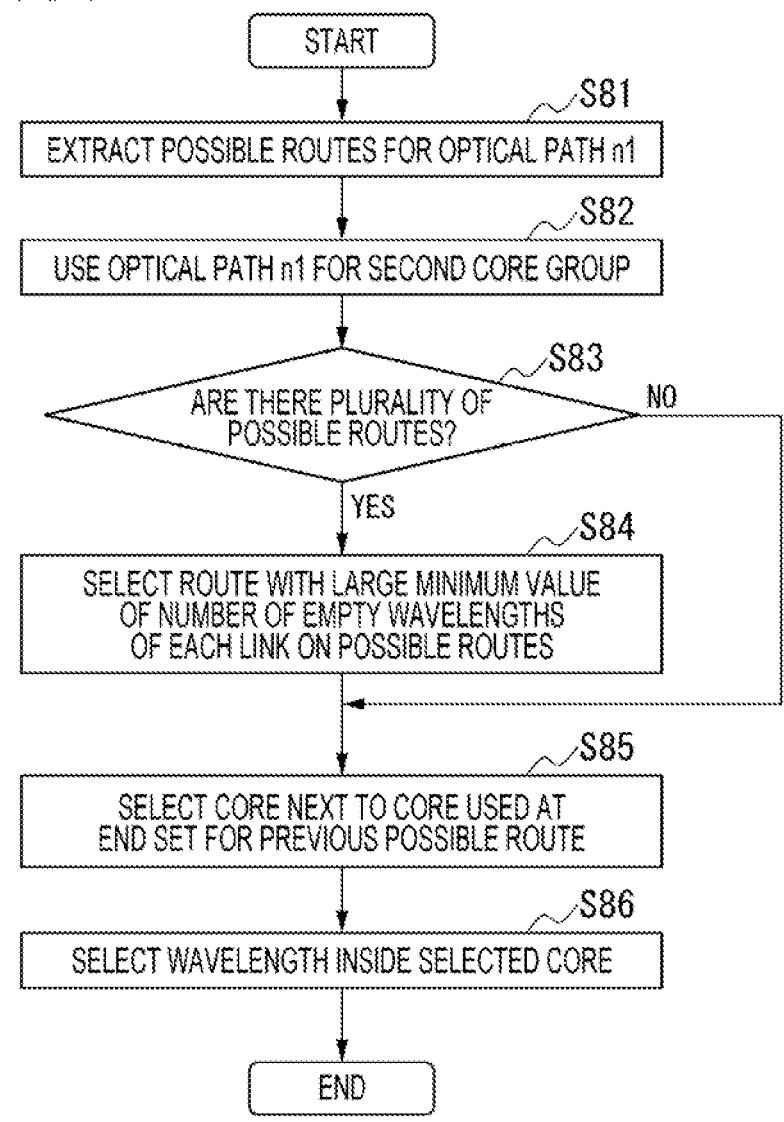
FIG. 30 is a flowchart for a processing procedure example according to the eighth embodiment.

FIG. 30 is a flowchart for a processing procedure example according to the present embodiment.

(Step 381) The route possibility extraction unit 12 calculates and thus extracts the possible routes for the optical path n1 by the Dijkstra's algorithm, for example. In the following description, a case where the link L1-the link L2-the link L5-the link L10 is calculated as a possible route for the optical path n1 as illustrated in FIG. 8 will be described.

(Step S82) The core selection unit 13 performs setting such that the optical path n1 is to be used for the second core group.

(Step S83) The core selection unit 13 determines whether or not there are a plurality of possible routes. In a case where it is determined that there are a plurality of possible routes (step S83; YES), the core selection unit 13 moves on to the processing in step S84. In a case where it is determined that there are not a plurality of possible routes (step S83; NO), the core selection unit 13 moves on to the processing in step S85.

(Step S84) The core selection unit 13 selects a route with a large minimum value of the number of empty wavelengths of each link on the possible route. Note that in a case where the minimum values of the number of empty wavelengths of each link on the plurality of possible routes are the same, the core selection unit 13 selects a route with a larger total empty wavelength, for example. After the processing, the core selection unit 13 moves on to the processing in step S85.

(Step S85) The core selection unit 13 selects a core (in the same core group) having a core ID next to that of the core used in the optical path set on the previous possible route (for example, the link L1-the link L2-the link L5-the link L10).

(Step S86) The wavelength selection unit 14 selects the wavelengths in the selected cores using, for example, the LF method or the FF method.

Here, a processing example in a case where there is a core continuity restriction will be described.

The communication route allocation device 1 stores information regarding a combination of a route, a link, and a core (referred to as a combination 1, for example) previously used from among combinations of routes, links, and cores satisfying a wavelength continuity and a core continuity restriction and information of the previous path number (the path number that has already been set). Next, the communication route allocation device 1 selects a combination with the minimum combination number from among combinations for which no optical paths have been set, if any, from among the combinations of routes, links, and cores other than the combination 1 (FIG. 31) and selects the combination number next to the combination number with the largest path number that has already been set if there are no combinations for which no optical paths have been set (FIG. 32), at the time of the next optical path setting.

FIG. 31 is a diagram for explaining a processing example in which there is a core continuity restriction and a minimum combination number out of combination numbers for which no optical paths have been set is selected from among combination numbers that satisfy a wavelength continuity restriction and the core continuity restriction. In the case of FIG. 31, the communication route allocation device 1 selects the minimum combination number 4 among the combination numbers for which no optical paths have been set.

FIG. 32 is a diagram for explaining a processing example in which there is a core continuity restriction and the next combination number for which the maximum path number has been set is selected from among the combination numbers that satisfy the wavelength continuity restriction and the core continuity restriction. In the case of FIG. 32, the communication route allocation device 1 selects the combination number 5 for which the maximum path number has been set, and selects the combination number 6 to be used for the next optical path setting.

Note that combinations of the possible routes, the links, and the cores are created similarly to the above case even in a case where there are a plurality of possible routes.

Here, a processing example in a case where there is no core continuity restriction will be described.

The communication route allocation device 1 stores information regarding a combination of a route, a link, and a core (referred to as a combination 1, for example) previously used from among combinations of routes, links, and cores satisfying wavelength continuity and information of the previous path number (the path number that has already been set). Next, the communication route allocation device 1 selects a combination with the minimum combination number from among combinations for which no optical paths have been set, if any, from among the combinations of routes, links, and cores other than the combination 1 (FIG. 33) and selects the combination number next to the combination number with the maximum path number that has already been set if there are no combinations for which no optical paths have been set (FIG. 34), at the time of the next optical path setting.

FIG. 33 is a diagram for explaining a processing example in which there is a core continuity restriction and the smallest combination number out of combination numbers for which no optical paths have been set is selected from among combination numbers that satisfy the wavelength continuity restriction and the core continuity restriction. In the case of FIG. 33, the communication route allocation device 1 selects the minimum combination number 4 from among the combination numbers for which no optical paths have been set.

FIG. 34 is a diagram for explaining a processing example in which there is a core continuity restriction and the next combination number for which the maximum path number has been set is selected from among the combination numbers that satisfy the wavelength continuity restriction and the core continuity restriction. In the case of FIG. 34, the communication route allocation device 1 selects the combination number 3 for which the maximum path number has been set, and selects the combination number 4 to be used for the next optical path setting.

Note that in a case where there is no core continuity restriction, only combination numbers increase in number as compared with the case where there is core continuity restriction and there is no change in processing.

Also, combinations of the possible routes, the links, and the cores are created similarly to the above case even in a case where there are a plurality of possible routes.

As described above, the number of wavelengths (the number of optical paths) to be accommodated in each core is controlled by selecting cores in the same core group in the round-robin in the present embodiment. Therefore, according to the present embodiment, the numbers of wavelengths used by each core are dispersed and are then leveled at last in a stage where the number of set wavelengths has increased. As a result, according to the present embodiment, it is possible to level the number of wavelengths used for each core and thereby to obtain the effect of power saving of the multicore optical amplifier over the entire network.

Note that the core selection unit 13 may select all the cores as targets in step S82 in the aforementioned example as well.

According to the communication route allocation device 1 configured as described above, the number of wavelengths arranged on the MC-EDFA is leveled by the optical path accommodation design, and it is thus possible to enhance a proportion of clad excitation and thereby to enhance the power saving effect. Also, according to the communication route allocation device 1, the clad excitation and both core excitation and the clad excitation are adopted, and it is thus possible to lead reduction of power saving as compared with the core excitation.

In a case where each of the aforementioned embodiments is applied only to the core excitation to level the number of wavelengths used by each core, a wavelength is accommodated one by one in the cores 1 to 7 when seven wavelengths are accommodated in the seven-core fiber, for example. In this case, it is necessary to drive the core excitation lasers for all the seven cores, which leads to an increase in power consumption.

On the other hand, if all the seven wavelengths are accommodated in the core 1, for example, by the method of each embodiment, only one core excitation laser is needed for the driving, and it is possible to reduce the amount of power consumption as compared with the case of the core excitation.

Modification Examples

Note that the method used by the wavelength selection unit 14 for selecting the wavelength may be a method other than the LF method and the FF method in each of the aforementioned embodiments.

Also, the method used by the route possibility extraction unit 12 for searching for the route may be a method other than the Dijkstra's algorithm in each of the aforementioned embodiments.

Additionally, the number of core groups is not limited to two and may be three or more in each of the aforementioned embodiments.

Although the embodiments of the present invention have been described in detail with reference to the drawings, specific configurations are not limited to the embodiments and include design and the like without departing from the gist of the present invention.

INDUSTRIAL APPLICABILITY

The present invention can be applied to an apparatus, a method, and a program for performing optical path accommodation design in a spatial multiplexing optical network system (SDM-NW).

REFERENCE SIGNS LIST

100 SDM optical network
1 Communication route allocation device
2 Network operation device
413, 413-1, 413-2, 423-3, 421 Spatial multiplexing optical amplifier
5, 5-1, 5-2, 5-3, 5-4, 5-5, 5-6, 5-7, 5-8 Multicore fiber
11 Acquisition unit
12 Route possibility extraction unit
13 Core selection unit
14 Wavelength selection unit
15 Storage unit
16 Output unit
21 Wavelength usage table creation unit
411, 411-1, 411-2, 411-3 Optical transceiver
412, 412-1, 412-2, 412-3 OXC/OADM

The invention claimed is:

1. A communication route allocation device comprising:
a route possibility extraction unit configured to extract connectable possible routes on the basis of utilization condition information of a network from among optical path routes connecting start points to end points of optical paths accommodating communication demand in the network;
a core selection unit configured to select a core, a link, and the optical path route to accommodate the optical paths by leveling wavelength utilization conditions over the entire network on the basis of utilization condition information of multicore fibers of all links in the network or the possible routes, the wavelength utilization conditions being the number of wavelengths arranged for each core on a multi-core erbium-doped fiber amplifier (MC-EDFA); and
a wavelength selection unit configured to select a wavelength to be used for the core, the link, and the optical path route selected by the route possibility extraction unit and the core selection unit.

2. The communication route allocation device according to claim 1, wherein the core selection unit is configured to select the core, the link, and the optical path route using a variance value or a standard deviation of the wavelength utilization conditions over the entire network.

3. The communication route allocation device according to claim 1, wherein the core selection unit is configured to select the core, the link, and the optical path route using a variance value or a standard deviation of wavelength utilization conditions of the possible routes.

4. The communication route allocation device according to claim 1, wherein the core selection unit is configured to select the core, the link, and the optical path route using an average value of wavelength utilization conditions in the link direction over the entire network.

5. The communication route allocation device according to claim 1, wherein the core selection unit is configured to select the core, the link, and the optical path route using an average value of wavelength utilization conditions in the link direction of the possible routes.

6. The communication route allocation device according to claim 1, wherein the core selection unit is configured to:

store information regarding a combination of the optical path route, the link, and the core previously used from among combinations of the optical path routes, the links, and the cores that use the same cores and satisfy a core continuity restriction and wavelength continuity and information regarding a path number that has previously been set;

for next path setting, select a combination of the minimum combination number from among combinations for which the optical paths have not been set if there are combinations for which no optical paths have been set from among the combinations of the optical path routes, the links, and the cores other than the combination; and select the next combination number of a combination number for which the maximum path number has been set if there are no combinations for which the optical paths have not been set.

7. A communication route allocation method comprising:

extracting connectable possible routes on the basis of utilization condition information of a network from among optical path routes connecting start points to end points of optical paths accommodating communication demand in the network;

selecting a core, a link, and an optical path route to accommodate optical paths by leveling wavelength utilization conditions over the entire network on the basis of utilization condition information of multicore fibers of all links in the network or the possible routes, the wavelength utilization conditions being the number of wavelengths arranged for each core on a multi-core erbium-doped fiber amplifier (MC-EDFA); and selecting a wavelength to be used for the core, the link, and the optical path route that have been selected.

8. A non-transitory computer readable storage medium storing a program that causes a computer to function as a communication route allocation device comprising:

a route possibility extraction unit configured to extract connectable possible routes on the basis of utilization condition information of a network from among optical path routes connecting start points to end points of optical paths accommodating communication demand in the network;

a core selection unit configured to select a core, a link, and the optical path route to accommodate the optical paths by leveling wavelength utilization conditions over the entire network on the basis of utilization condition information of multicore fibers of all links in the network or the possible routes, the wavelength utilization conditions being the number of wavelengths arranged for each core on a multi-core erbium-doped fiber amplifier (MC-EDFA); and a wavelength selection unit configured to select a wavelength to be used for the core, the link, and the optical path route selected by the route possibility extraction unit and the core selection unit.

* * * * *